July 24, 1923.
L. W. ANDERSON
TUNNELING MACHINE
Filed July 21, 1919  16 Sheets-Sheet 1
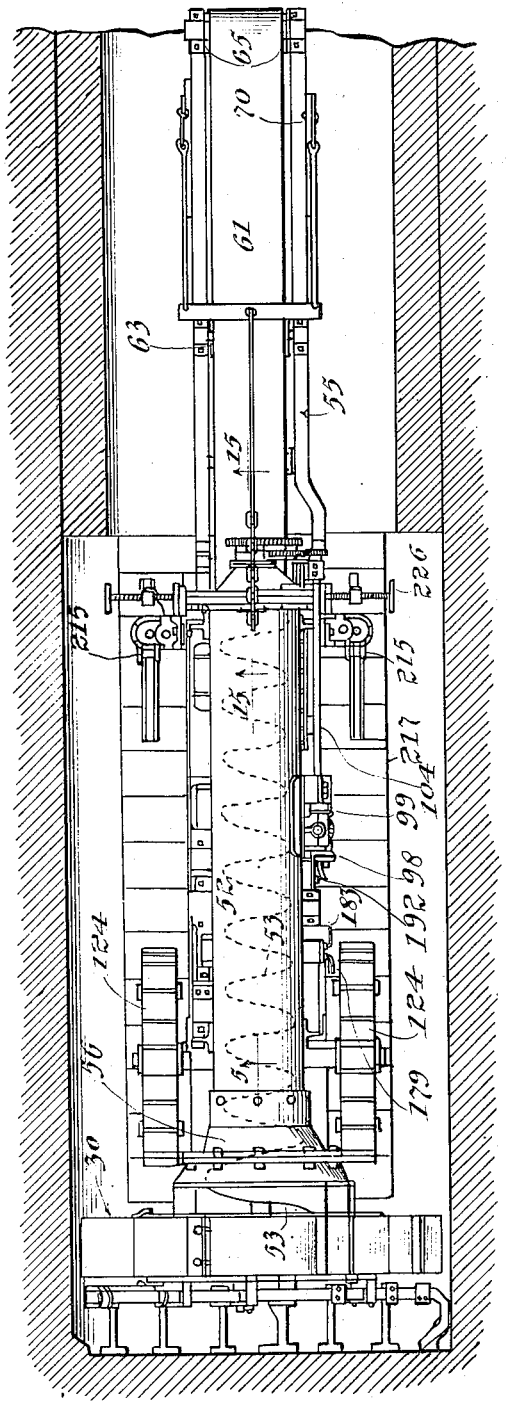
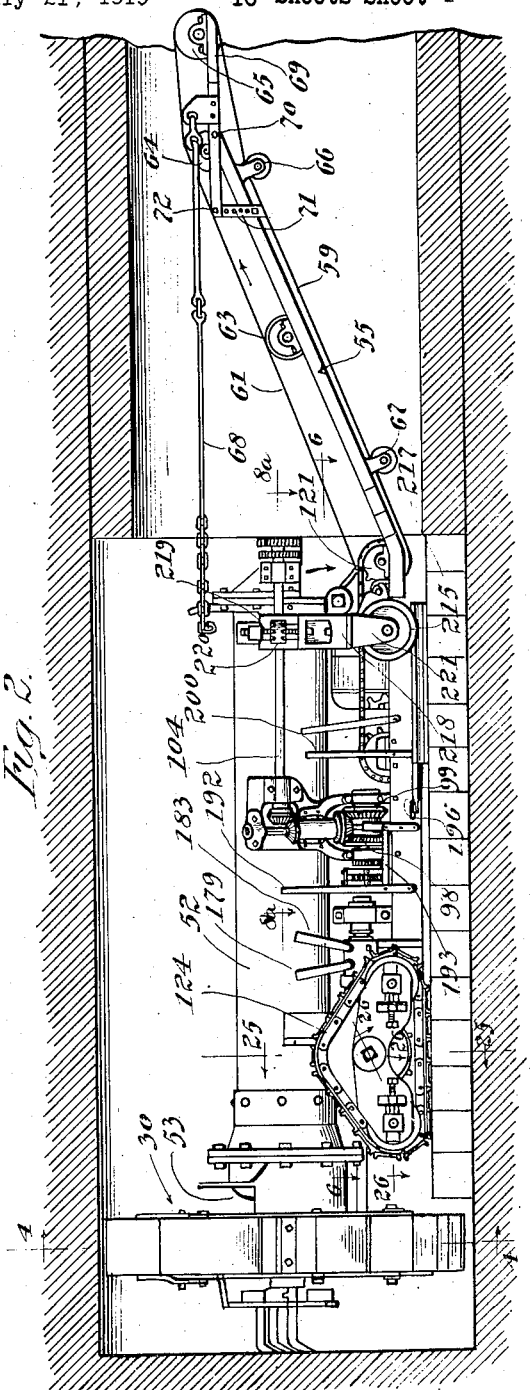
Inventor:
Louis W. Anderson
By Jones, Addington, Ames & Seibold Attys.

July 24, 1923. 1,462,997
L. W. ANDERSON
TUNNELING MACHINE
Filed July 21, 1919 16 Sheets-Sheet 2

July 24, 1923.

L. W. ANDERSON 1,462,997

TUNNELING MACHINE

Filed July 21, 1919

Inventor
Louis W. Anderson
By
Jones, Addington, Ames & Seibold, Attys.

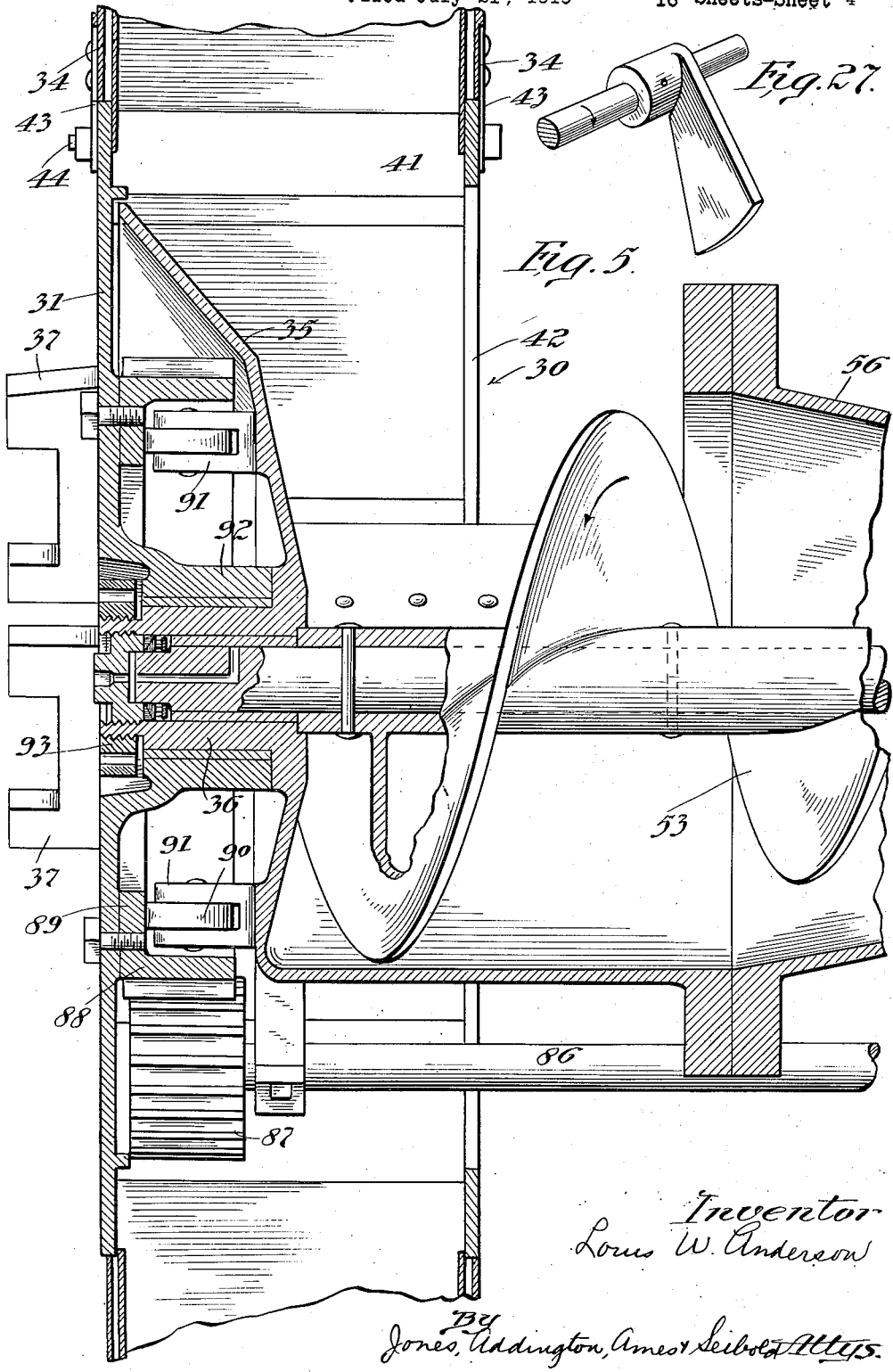

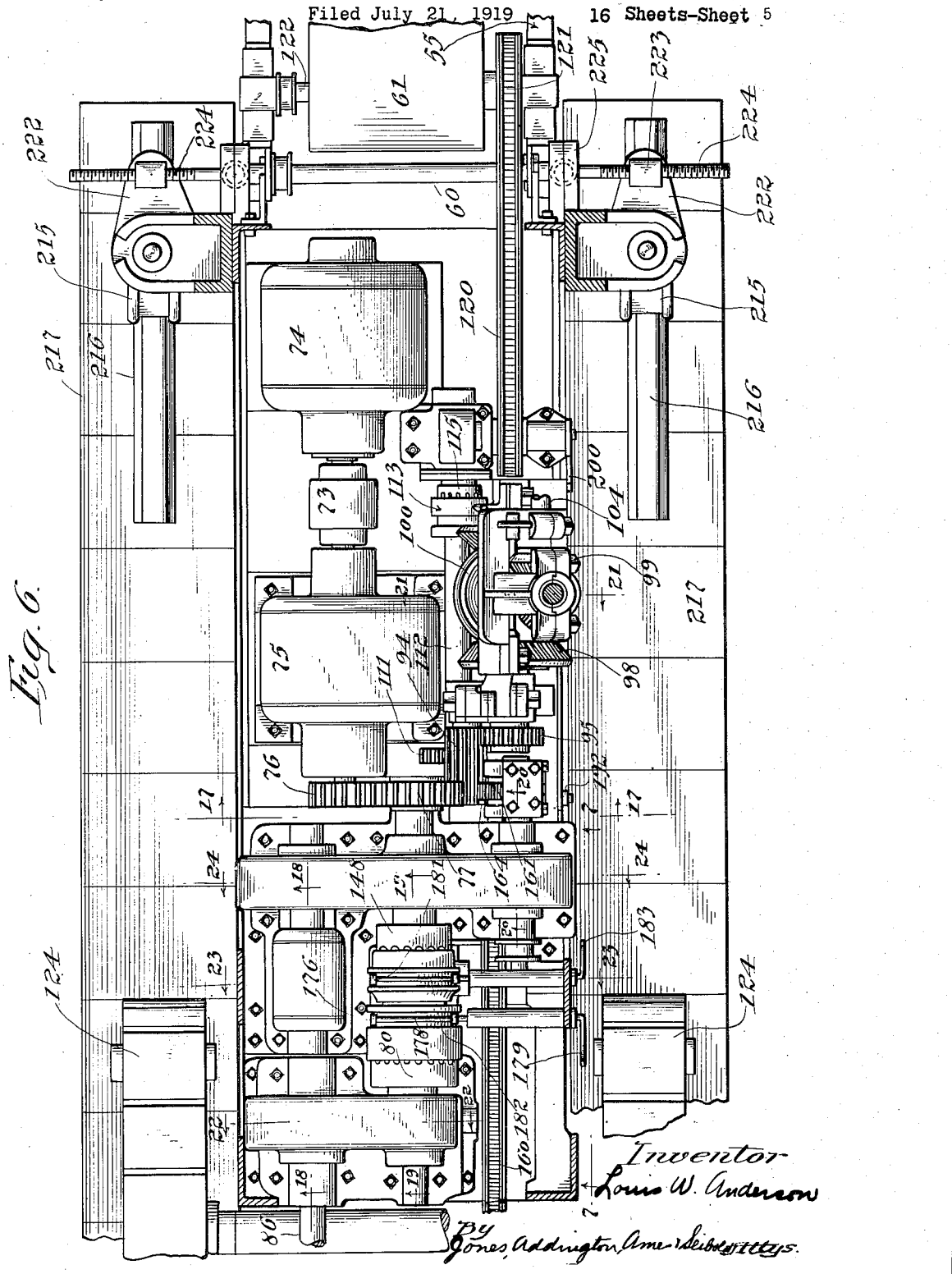

July 24, 1923.
L. W. ANDERSON
TUNNELING MACHINE
Filed July 21, 1919 16 Sheets-Sheet 6
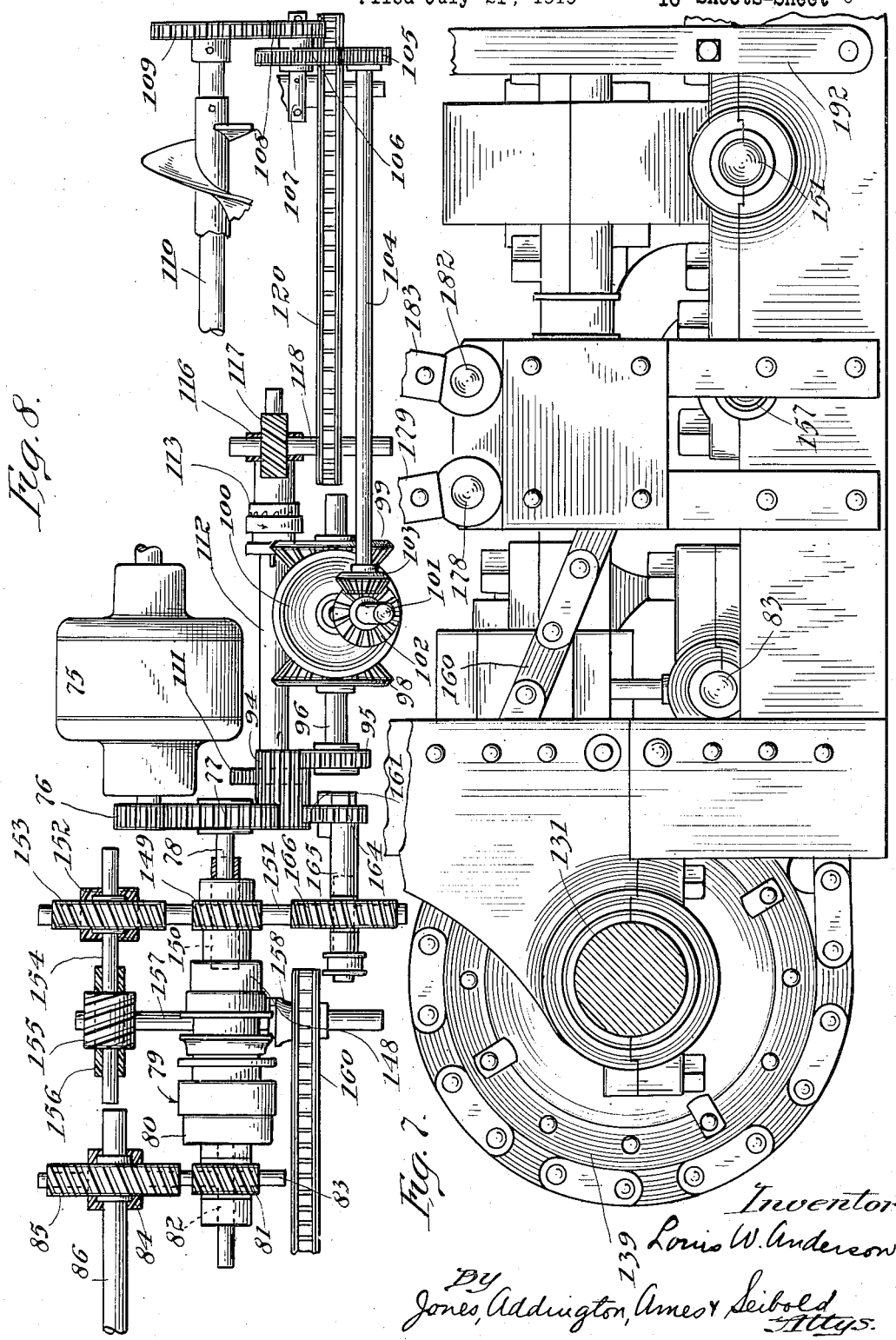

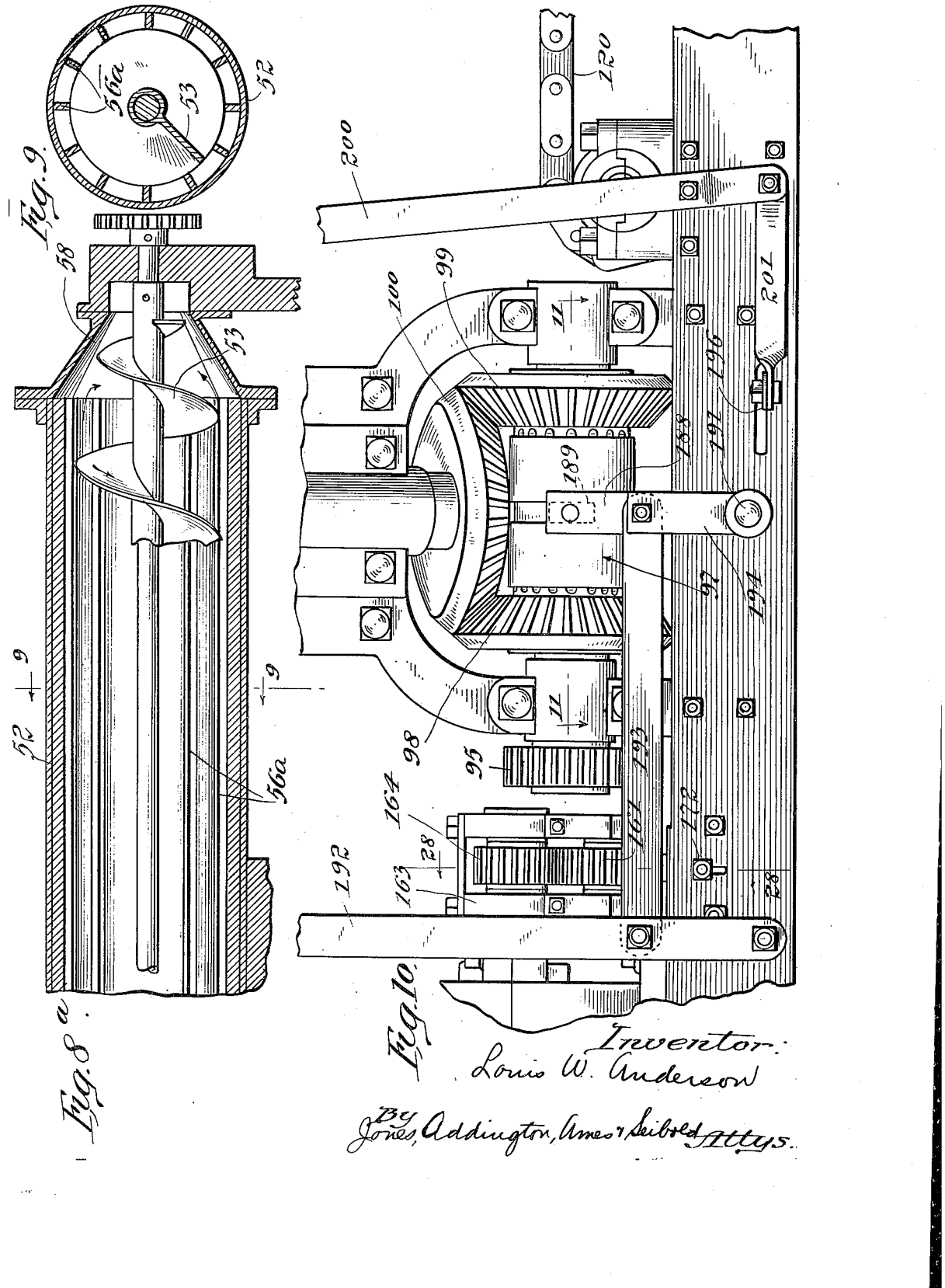

July 24, 1923.
L. W. ANDERSON
TUNNELING MACHINE
Filed July 21, 1919
1,462,997
16 Sheets-Sheet 8
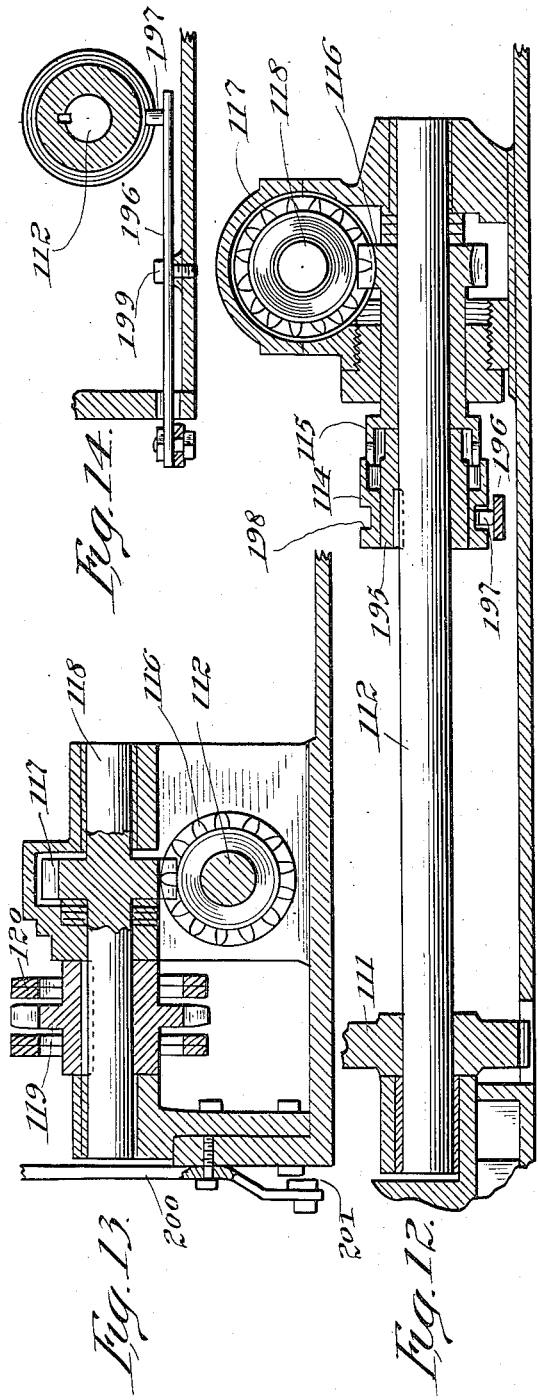
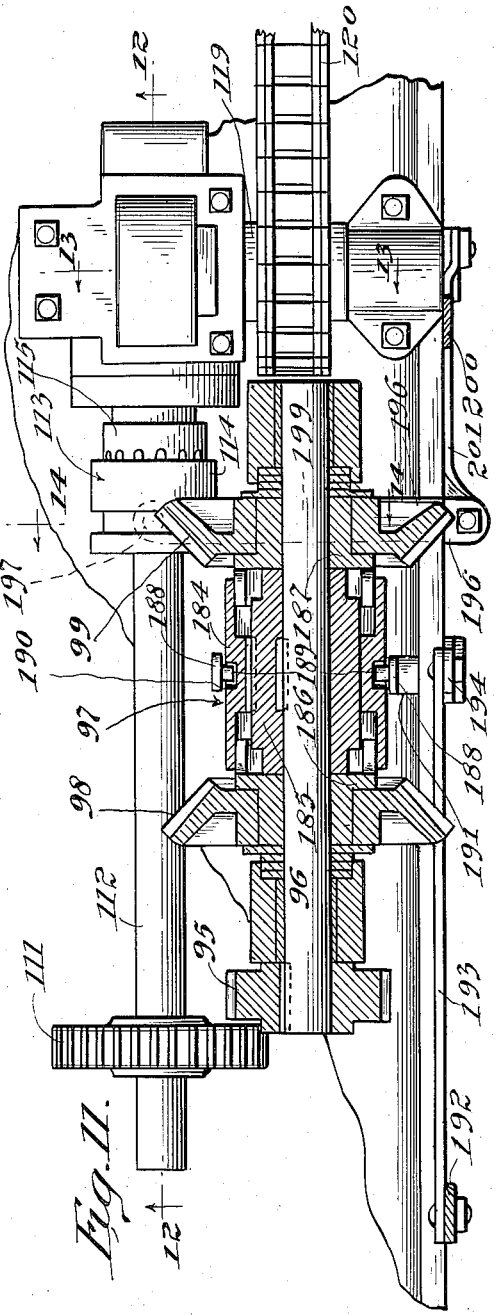
Inventor
Louis W. Anderson
By Jones, Addington, Ames & Seibold
Attys.

July 24, 1923.

L. W. ANDERSON

TUNNELING MACHINE

Filed July 21, 1919 16 Sheets-Sheet 9

1,462,997

Inventor
Louis W. Anderson
By
Jones, Addington, Ames & Seibert Attys.

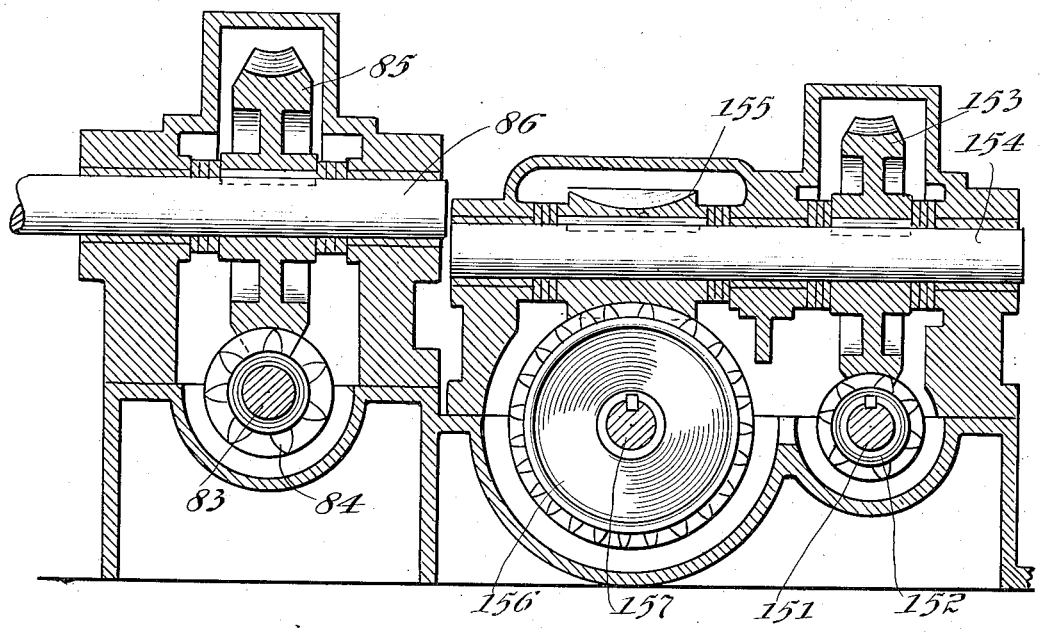
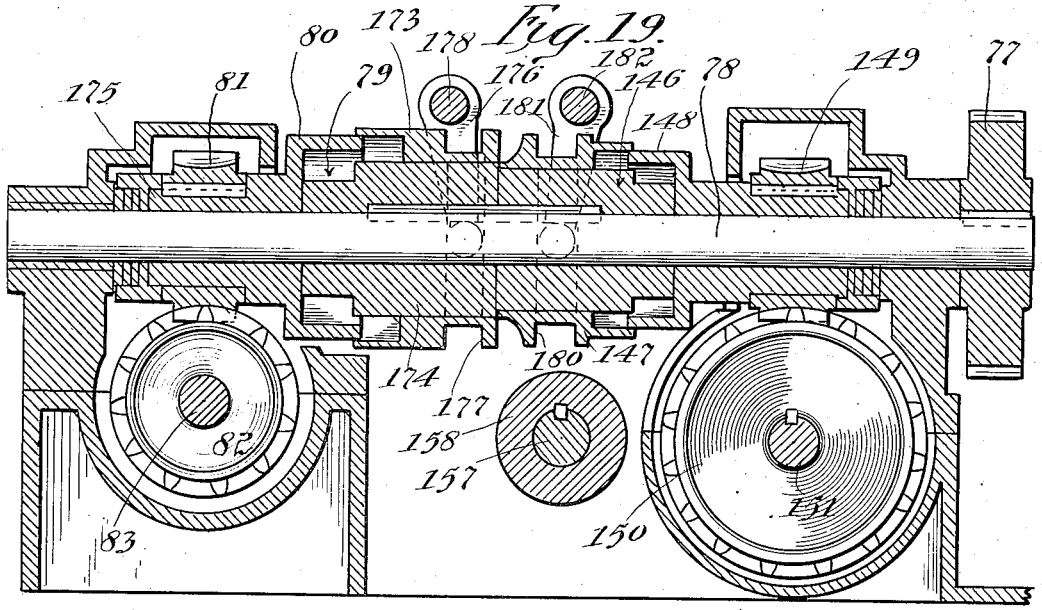

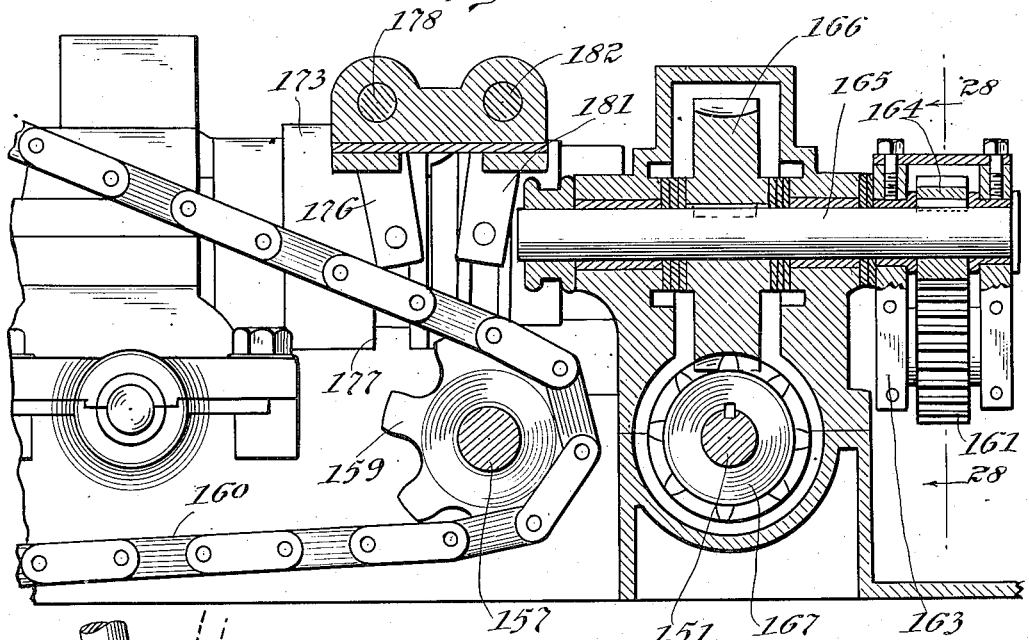
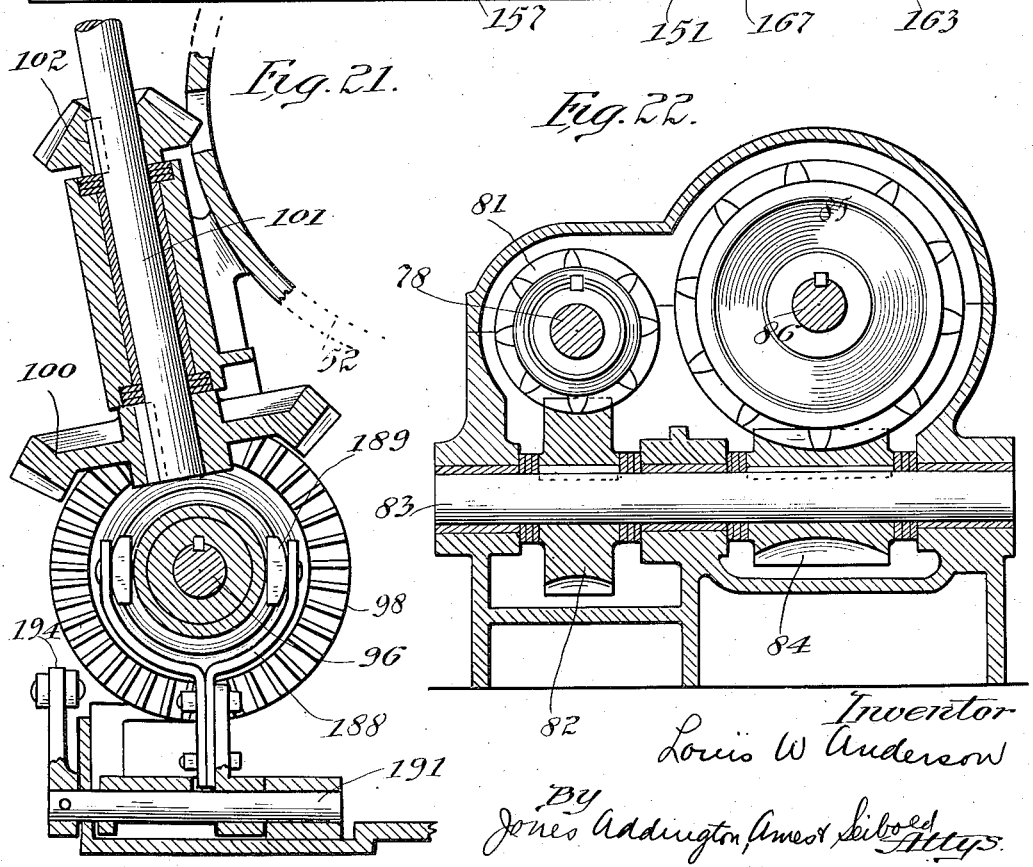

Inventor
Louis W. Anderson
By
Jones, Addington, Ames & Seibold
Attys

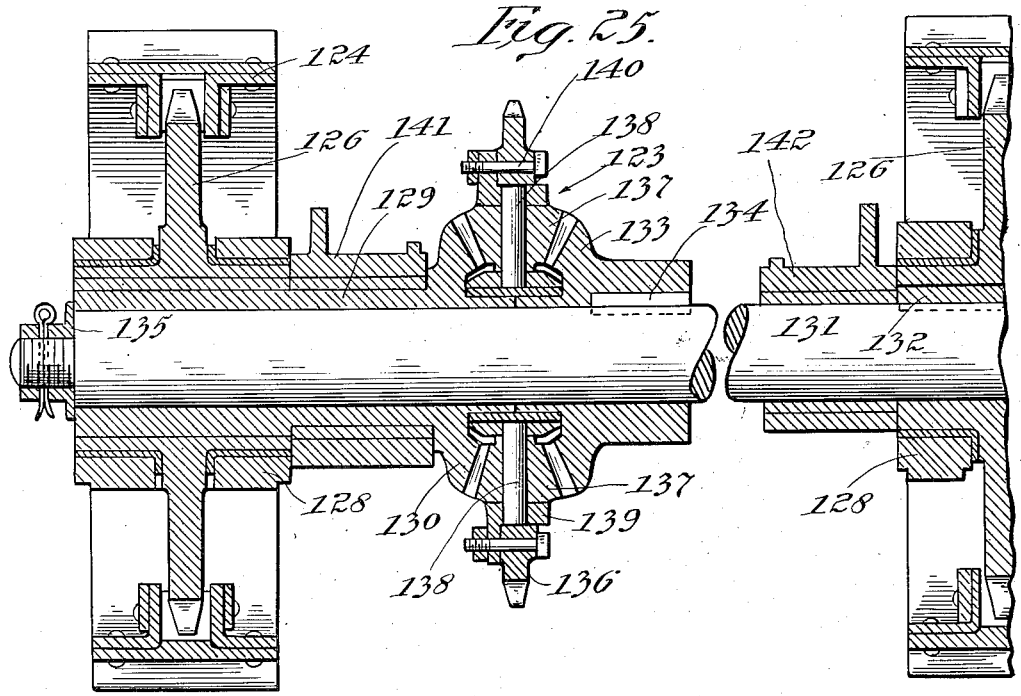
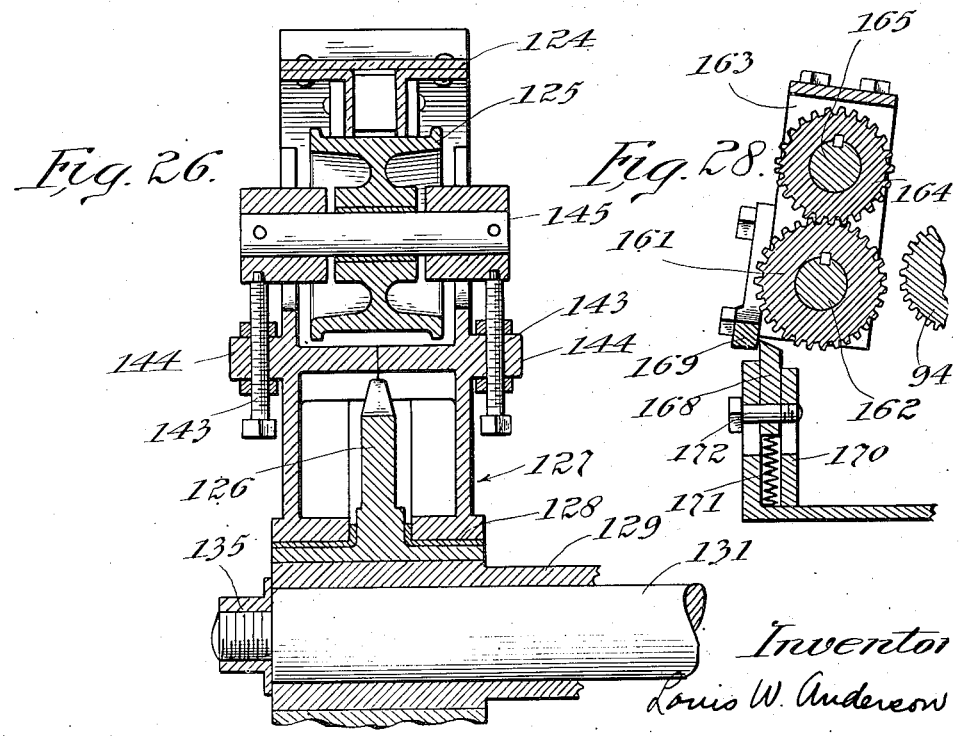

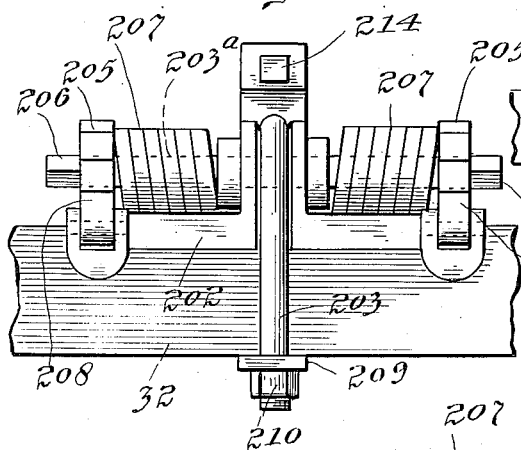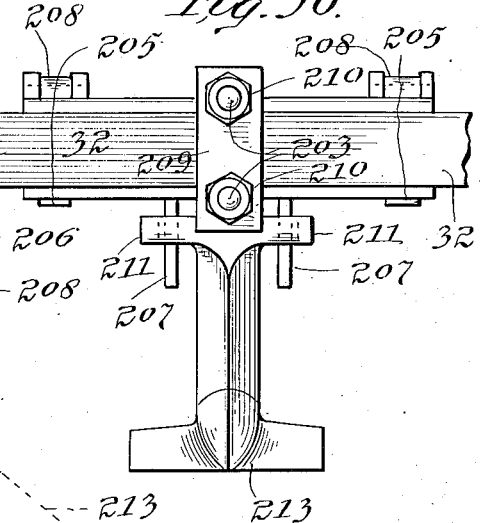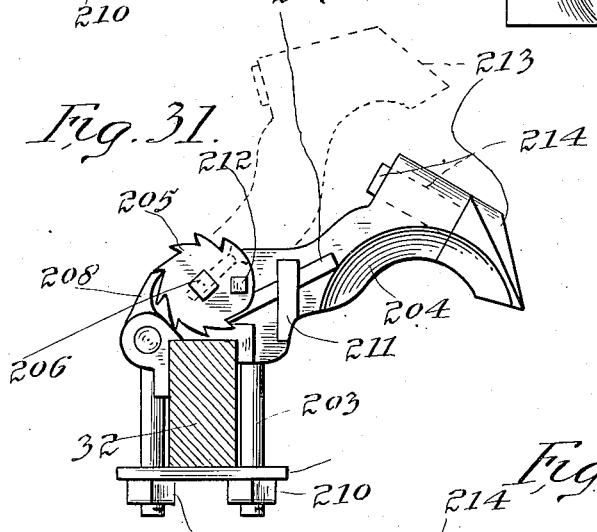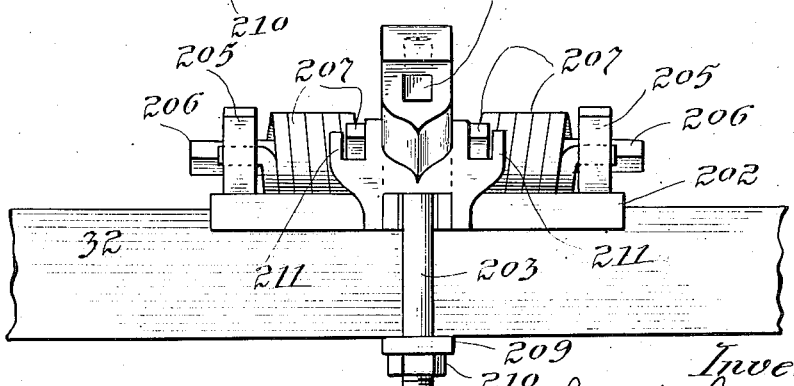

July 24, 1923.

L. W. ANDERSON

TUNNELING MACHINE

Filed July 21, 1919  16 Sheets-Sheet 15

1,462,997

Inventor
Louis W. Anderson
By Jones, Addington, Ames & Seibold Attys.

July 24, 1923.
L. W. ANDERSON
TUNNELING MACHINE
Filed July 21, 1919
1,462,997
16 Sheets-Sheet 16

Inventor:
Louis W. Anderson
By
Jones, Addington, Ames & Seibold Attys.

Patented July 24, 1923.

1,462,997

UNITED STATES PATENT OFFICE.

LOUIS W. ANDERSON, OF GRAND RAPIDS, MICHIGAN, ASSIGNOR TO THE TUNNEL & SEWER MACHINE ENGINEERING COMPANY, OF BUFFALO, NEW YORK, A CORPORATION OF NEW YORK.

TUNNELING MACHINE.

Application filed July 21, 1919. Serial No. 312,325.

*To all whom it may concern:*

Be it known that I, LOUIS W. ANDERSON, a citizen of the United States, residing at Grand Rapids, in the county of Kent and State of Michigan, have invented new and useful Improvements in Tunneling Machines, of which the following is a full, clear, concise, and exact description, reference being had to the accompanying drawing, forming a part of this specification.

My invention relates to tunneling machines.

One of the objects of my invention is to provide an improved type of tunneling machine for making a small bore tunnel, which will be simple and compact in construction, and efficient in operation.

A further object of my invention is to improve parts of the construction of a tunneling machine. Further objects will appear from the detailed description which follows, and from the appended claims.

In the drawings, in which my invention is disclosed—

Fig. 1 is a plan view of a tunneling machine embodying my invention, showing it in position in the tunnel;

Fig. 2 is a side elevation of the machine;

Fig. 5 is a vertical longitudinal section on the line 5—5 of Fig. 1 through the hopper which receives the material from the pick-up bucket;

Fig. 6 is a section on the line 6—6 of Fig. 2, showing the motor and parts of the transmission;

Fig. 7 is a section on the line 7—7 of Fig. 6;

Fig. 8 is a diagrammatic view showing a part of the transmission;

Figure 15:
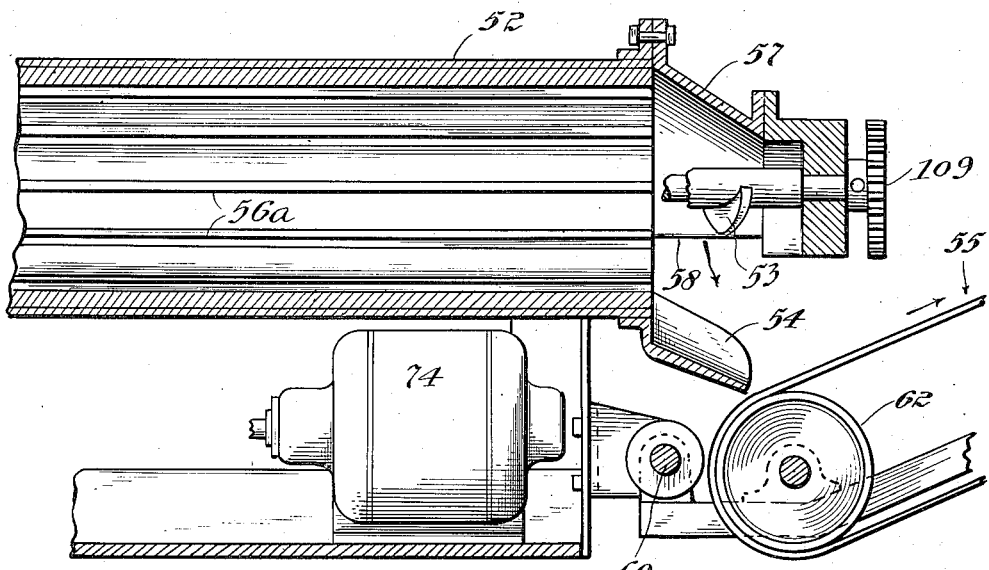
Figure 16:
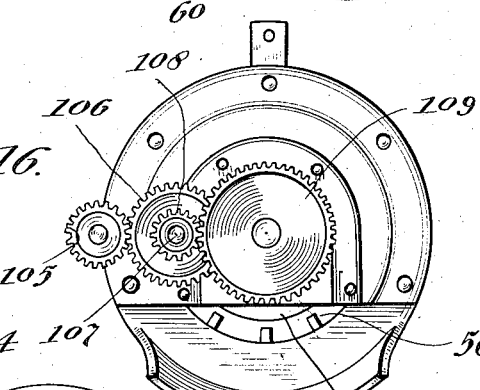
Figure 17:
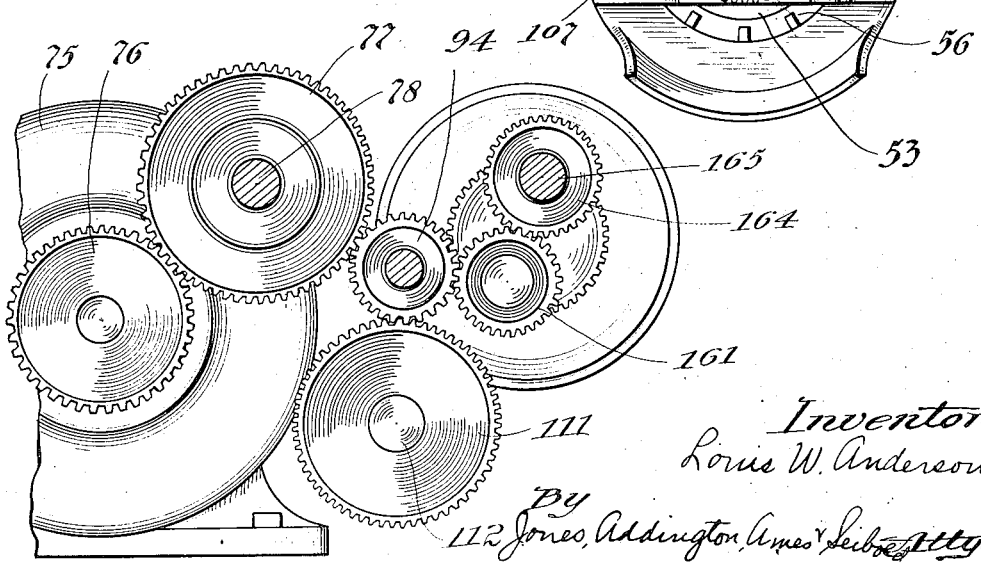
Figure 23:
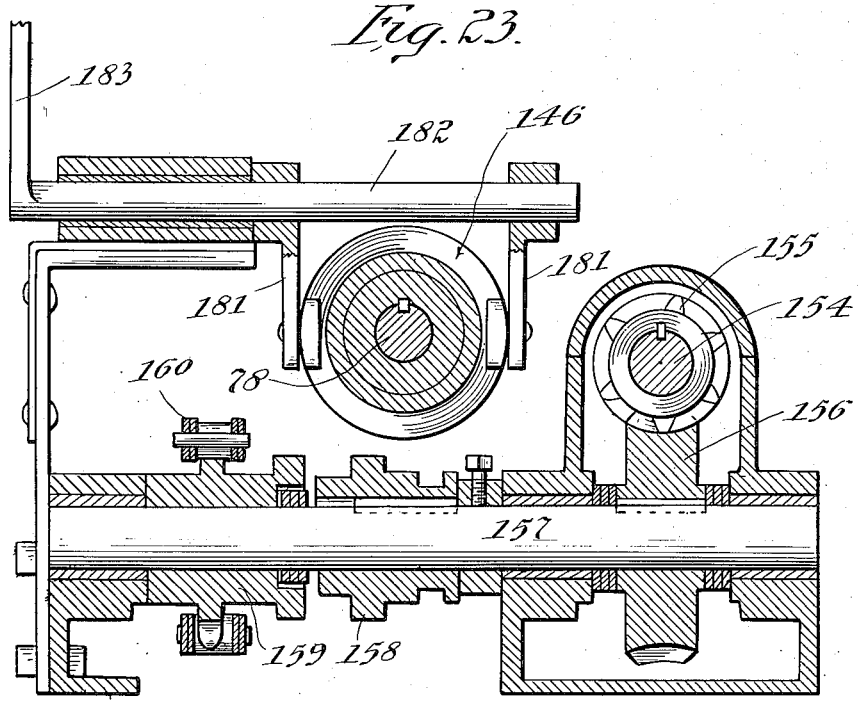
Figure 24:
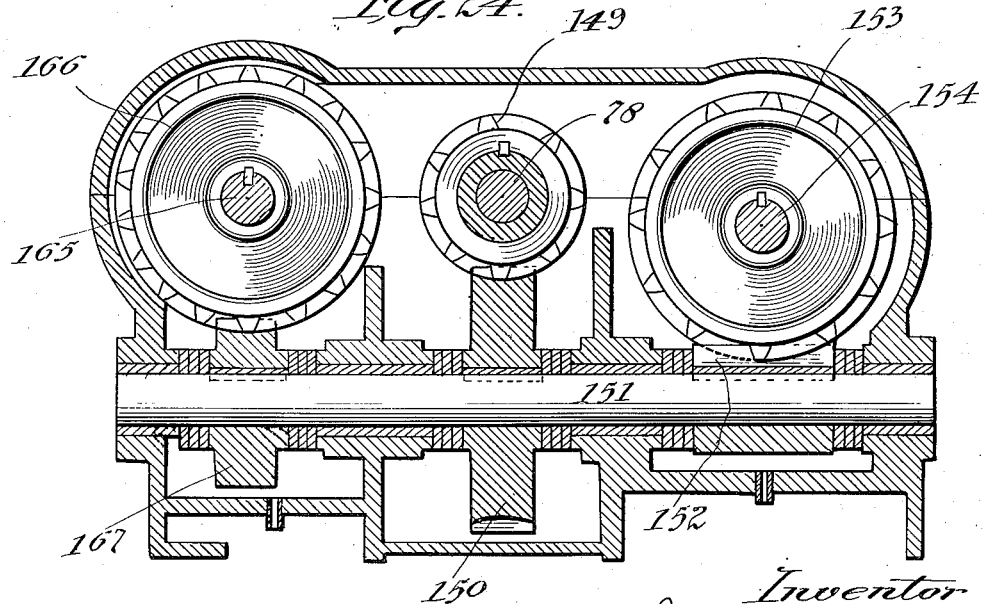
Figure 33:
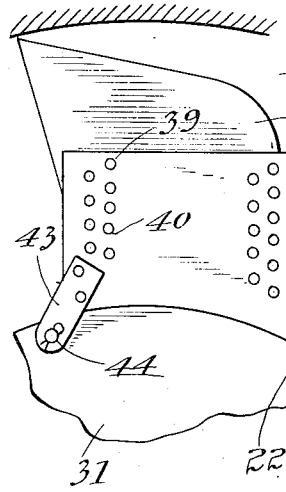
Figure 34:
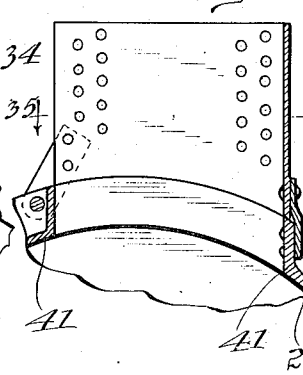
Figure 35:
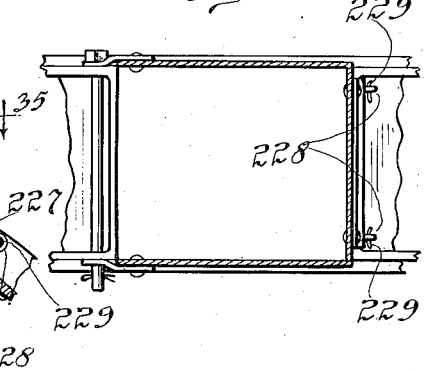
Figure 36:
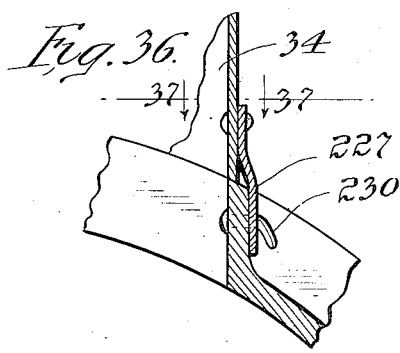
Figure 37:
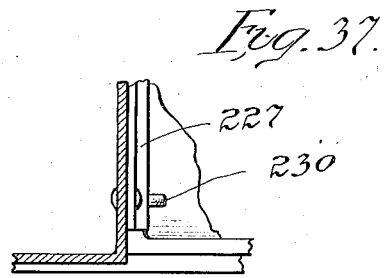
Figure 38:
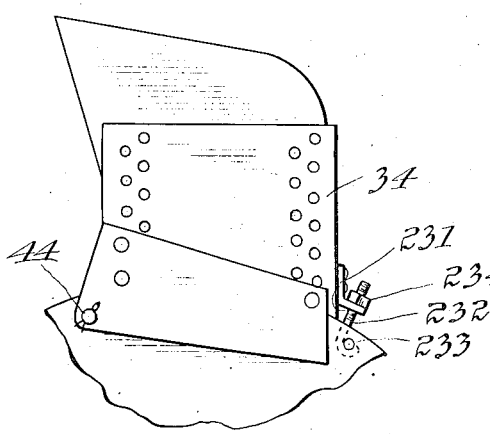
Figure 39:
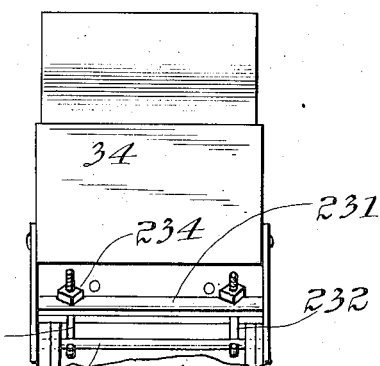
Figure 40:
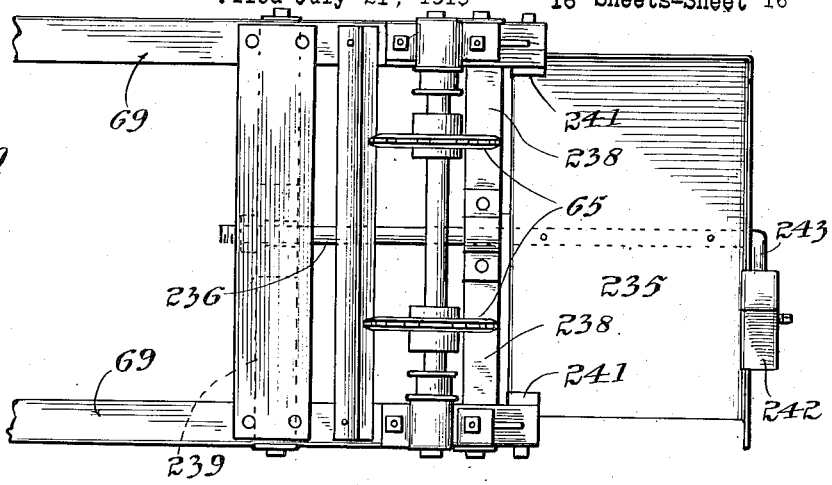
Figure 41:
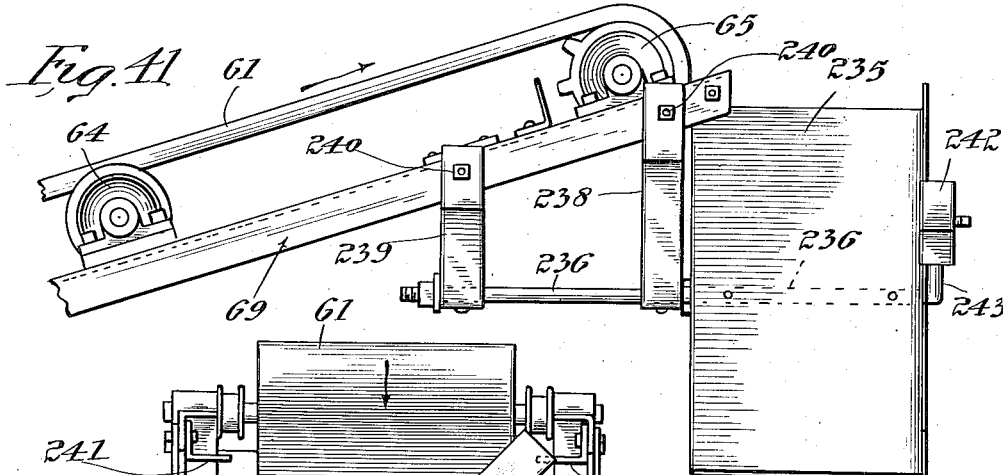

Fig. 8ª is a horizontal sectional view on the line 8ª—8ª of Fig. 2 through the screw conveyor;

Fig. 9 is a transverse section on the line 9—9 of Fig. 8ª;

Fig. 10 is a side elevation of part of the transmission;

Fig. 11 is a horizontal section on the line 11—11 of Fig. 10;

Fig. 12 is a vertical section on the line 12—12 of Fig. 11;

Fig. 13 is a vertical transverse section on the line 13—13 of Fig. 11;

Fig. 14 is a vertical transverse section on the line 14—14 of Fig. 11;

Fig. 15 is a vertical longitudinal section on the line 15—15 of Fig. 1 through the discharge end of the screw conveyor;

Fig. 16 is a rear end view of the screw conveyor;

Fig. 17 is a diagrammatic view showing part of the transmission;

Fig. 18 is a vertical longitudinal section on the line 18—18 of Fig. 6, showing part of the transmission;

Fig. 19 is a vertical longitudinal section on the line 19—19 of Fig. 6, showing another part of the transmission;

Fig. 20 is a vertical longitudinal section on the line 20—20 of Fig. 6, showing another part of the transmission;

Fig. 21 is a vertical transverse section on the line 21—21 of Fig. 6;

Fig. 22 is a vertical transverse section on the line 22—22 of Fig. 6;

Fig. 23 is a vertical transverse section on the line 23—23 of Fig. 6;

Fig. 24 is a vertical transverse section on the line 24—24 of Fig. 6;

Fig. 25 is a vertical transverse section on the line 25—25 of Fig. 2, showing the differential and caterpillar drive;

Fig. 26 is a view on the line 26—26 of Fig. 2, showing a part of the caterpillar;

Fig. 27 (on sheet 4 of the drawings) is a perspective view showing another form of device for advancing the excavated material received from the pick-up buckets;

Fig. 28 is a section on the line 28—28 of Fig. 10;

Figs. 29, 30, 31 and 32 are detail views of the spring knife construction;

Fig. 33 is a side elevation of one form of bucket and chute showing the connection with the rotatable boring head;

Fig. 34 is a longitudinal section through the construction shown in Fig. 33;

Fig. 35 is a section on the line 35—35 of Fig. 34;

Fig. 36 is a sectional view showing another form of connection between the chute and rotatable head;

Fig. 37 is a section on the line 37—37 of Fig. 36;

Fig. 38 is a side elevation of still another form of bucket and chute;

Fig. 39 is a view from the right of Fig. 38;

Fig. 40 is a plan view of the rear end of the belt conveyor showing the tilting chute attached thereto;

Fig. 41 is a side elevation of the parts shown in Fig. 40; and

Figure 42:
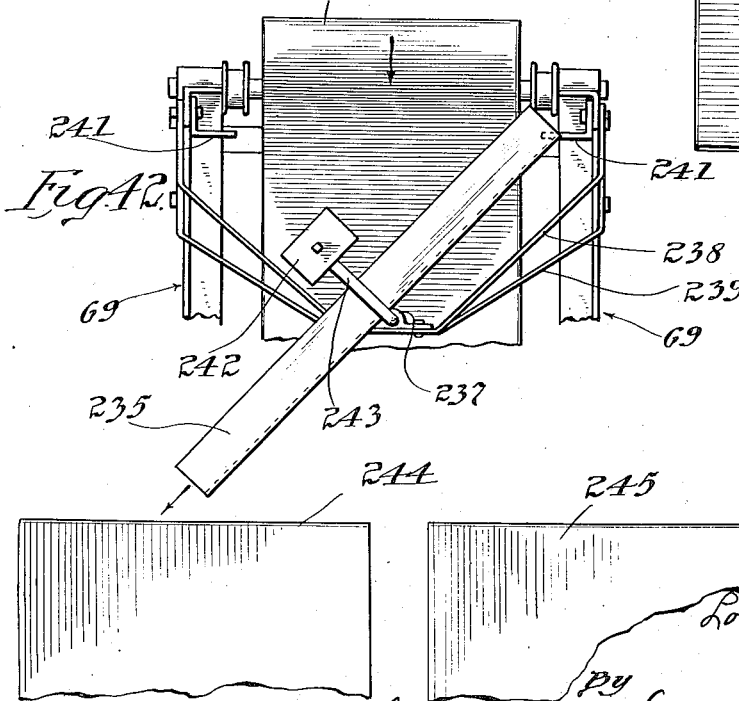

Fig. 42 is a rear elevation of the parts shown in Fig. 40.

In order to give a general idea of the construction, and referring to Figs. 1 and 2, it is here stated that the tunneling machine shown is designed to make a small bore tunnel, and that the machine comprises a rotary boring head, which makes a circular face cut, a set of pick-up buckets which operate just back of the boring head, and pick up the material which is loosened by the boring head, a central hopper which receives the material scooped up by these pick-up buckets, an axially extending cylindrical tube in which a screw conveyor operates, which receives the material from the aforesaid hopper, and through which tube the material is forced rearwardly, an adjustable belt conveyor for receiving the material as it is discharged from the aforesaid tube, which belt conveyor conveys the material rearwardly, a caterpiller traction device for supporting the front end of the aforesaid tube (the tube forming a support for the boring head and pick-up bucket, and various parts of the transmission), a pair of track engaging wheels for supporting the rear end of the aforesaid tube, a motor for driving the boring head, the pick-up buckets, the screw conveyor, the belt conveyor, and the caterpillar track and mechanism, and transmission mechanism from the motor to the various parts.

Means are provided for reversing the rotation of the screw conveyor, so that in case the screw becomes jammed by stones or other obstructions, the screw can be reversed to release the obstruction.

It is also here stated that the boring head with the pick-up buckets is readily detachable from the rest of the machine, as is also the belt conveyor located at the rear of the machine. The fact that the boring head is readily detachable is a great convenience in bricking up the tunnel, as the boring head can be easily disconnected and left in place right at the face of the cut, while the machine is backed away, and the tunnel can then be bricked up to just in the rear of the pick-up bucket.

Also the fact that the belt conveyor is readily removable is a very desirable feature, as on small bores, particularly, the conveyors should be readily removable to permit of the masonry being placed up close to the rear of the machine.

Referring now to the drawing in detail, I will first describe the parts which have to do with the excavating and conveying of the material, and will describe these parts in the order in which they act on the material.

Figure 3:
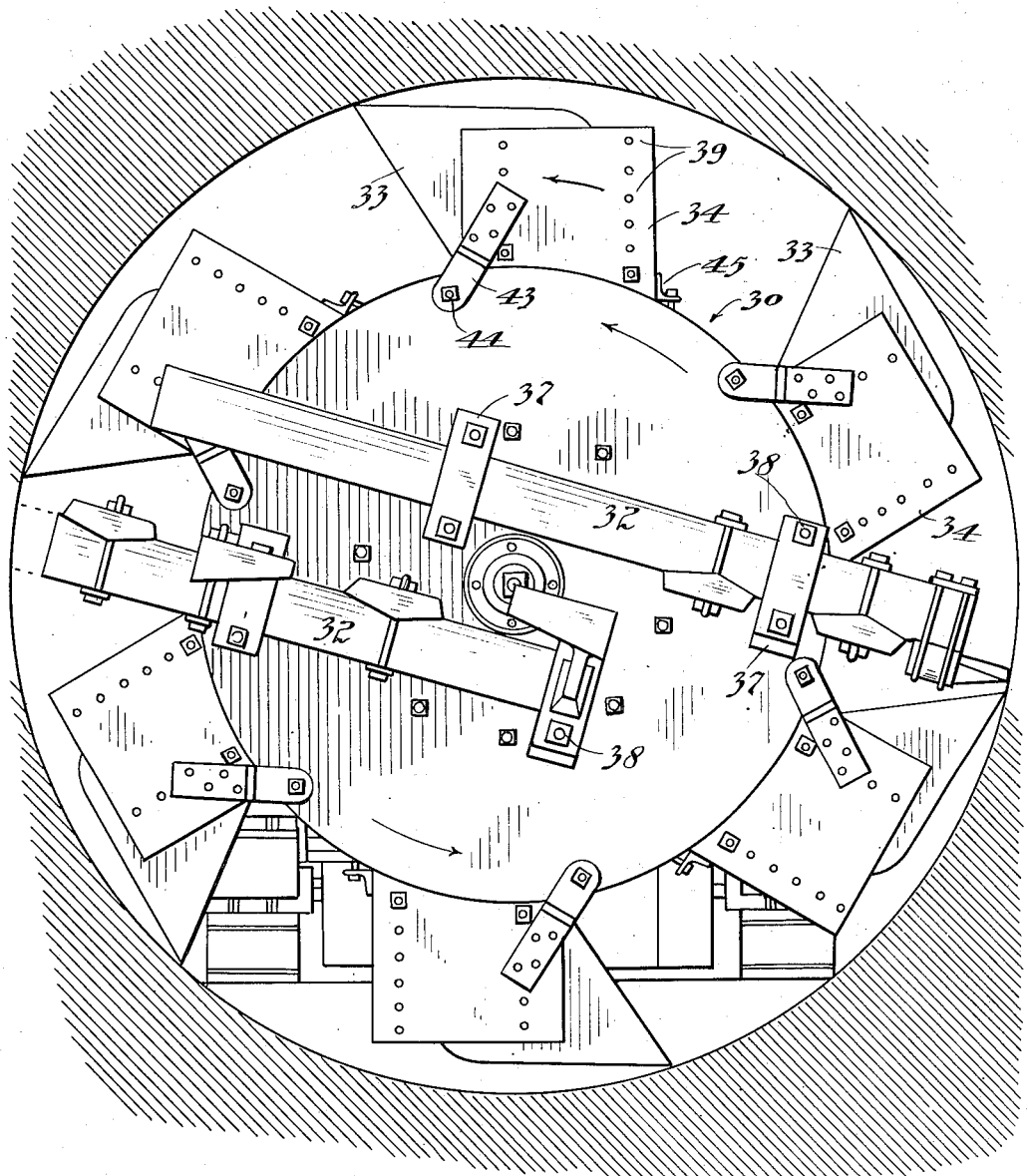
Fig. 3 is a front elevation, showing the cutters or boring-head and pick-up buckets.
Figure 4:
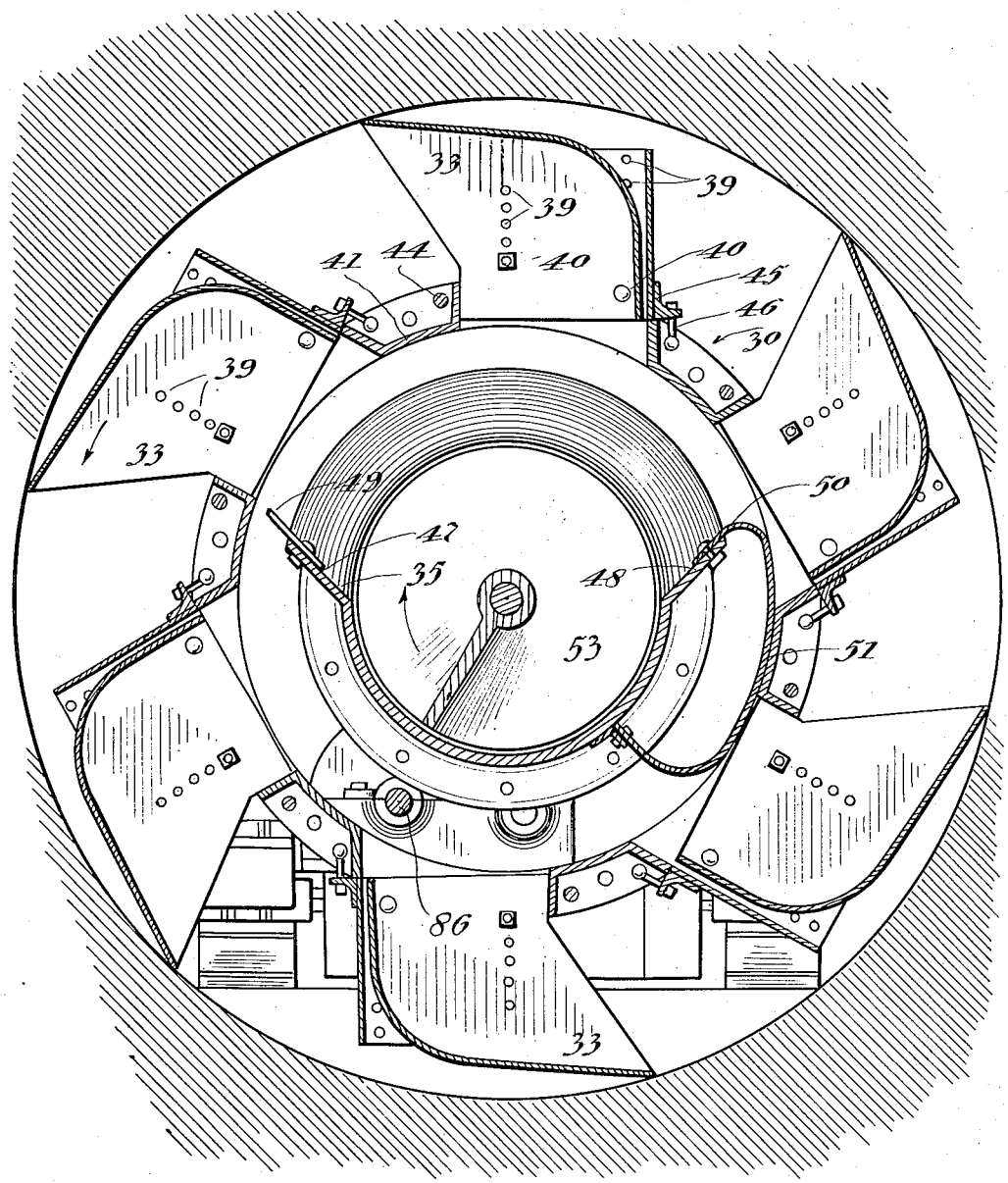
Fig. 4 is a transverse vertical section through the pick-up buckets on the line 4—4 of Fig. 2.

Taking up first the boring and pick-up head, indicated in general at 30 in Figs. 1 and 2, and shown in detail in Figs. 3, 4, and 5, this comprises a rotatably mounted circular head or disk 31, a pair of boring or cutter bars 32 (Fig. 3), secured to the rotatable head, a series of pick-up buckets 33 detachably secured to the rotatable head 31, for picking up the excavated material as it falls to the bottom of the bore, and a plurality of chutes 34, one for each pick-up bucket 33, for directing the material as it slides out of the buckets into the hopper 35 (Figs. 4 and 5) from which hopper, it is delivered to the screw conveyor.

The rotatable head 31 is on a boss or stud 36, which may be formed integral with the front end of the hopper 35.

The boring bars 32 are adjustably secured in supports 37, which supports are secured to the rotatable head 31. The bar 32 may thus be adjusted in or out radially for bores of different diameters. This may be done by loosening the clamping nuts 38 which hold the boring bars 32 in position on the supports 37, and shoving the bars in or out as desired.

The buckets 33 are secured to and carried by the chutes 34, and are adjustable in and out radially, for bores of different diameters. For this purpose, a series of bolt holes 39 are provided in the buckets and the chutes, through which bolts 40 may be inserted for adjustably securing the buckets in position on the chutes. The chutes are secured to and supported by the rotatable head 31. For this purpose channel shaped supports or ribs 41 (Figs. 4 and 5) may be formed integral with the rotatable head 41, and extend rearwardly therefrom, and to the rear end of these channel shaped ribs, is secured a strengthening and supporting ring 42. The inner edge of the side of the chute 34 which is nearest the face of the cut, rests against the outer edge of the rotatable head 31, shown in Fig. 5. The inner edge of the side of the chute 34, which is farthest from the face of the cut, rests against the outer edge of the supporting ring 42 (Fig. 5). The inner edge of that side of the chute 34 which is intermediate the two sides referred to above, rests against an edge of the channel shaped rib 41 (Fig. 4).

As shown in Fig. 4, these chutes are substantially U-shaped in cross section. For convenience, the intermediate portion of the chute will be described as the bottom and the two portions connected by the intermediate portion will be referred to as the sides of the chute. The sides of the chute are connected to the rotatable head 31 and to the supporting ring 42 respectively, by means of connecting plates 43, riveted to the sides of the chute, and secured to the rotatable head 31 and ring 42, by means of a long bolt 44 extending through and between the ring 42 and the rotatable head 31. An angle-iron 45 extends across the bottom of the chute, and is secured to the head 31 and to the ring 42 by means of hook-bolts 46, hooked into the ring and head and extending through openings in the angle-iron 45.

The rotatable head 31, in combination with the ring 42 and the channel members 41 constitute in effect a central rotatable chamber to which the chutes are secured, the chamber having an open side, the hopper 35 being located in the chamber and extending out through the open sides thereof.

Taking up next the hopper 35 which receives the material as it is delivered from the buckets 33, this also is shown in detail in Figs. 4 and 5. It comprises a trough-shaped casting, having flaring sides 47 and 48, (Fig. 4) for receiving the material from the buckets, these flaring sides being provided with sheet metal extensions 49 and 50, the purpose of which is to prevent injury to the machine, due to material such as rocks or other hard substances being caught between the channel-shaped supports 41 and the outer edges of the hopper. To explain further, these sheet metal extensions 49 and 50 are so light and yielding that they will bend or give if the material is caught between their edges and the channel supports 41.

If the edges of the hopper were rigid, and the hard substances were caught between these edges and the channeled support 41, serious injury to the machine would be likely to result. As it is, however, the extensions 49 and 50 are simply bent out of shape and can be easily bent back into shape if necessary.

In order to prevent the excavated material from falling out of the buckets before the proper time, the plate 50 is extended downwardly, to form a curved baffle plate as indicated at 51, to keep the material from falling out of the buckets as they travel upwardly, until the buckets have passed the upper edge of the baffle plate.

The screw conveyor mechanism, which advances the excavated material from the hopper 35 and discharges it on to the belt conveyor, is shown in a general way in Figs. 1 and 2, and is shown more in detail, in Figs. 4, 5, 8ª, 9, 15, and 16. It comprises a long, hollow cylinder 52, in which operates a helical conveyor screw 53, which forces the material from the hopper 35, rearwardly through the tube 52, and delivers it to the discharge chute 54, which directs it on to the belt conveyor 55 (Fig. 15).

The diameter of the conveyor tube 52, is considerably less than the diameter of the hopper 35, and a conical reducer 56 is inserted between the hopper and the conveyor tube. This reduction in the size of the conveyor tube, affords more room for the mechanism underneath the conveyor tube, and likewise tends to consolidate the excavated material as it is driven along by the screw and gives a more positive action. As shown in Fig. 5, that part of the conveyor screw which operates in the hopper 35, is of larger diameter than that part of the screw which operates in the conveyor tube 52, and the conveyor screw tapers between the hopper 35 and the conveyor tube 52.

The conveyor tube 52, is provided with longitudinally extending ribs 56ª (Figs. 8ª, 9, and 15) which tend to keep the excavated material from sticking to the screw, and cause the material to move lengthwise of the cylinder rather than to rotate with the screw. The rear end of the conveyor tube 52, is provided with a hood 57, which hood is provided with a rib 58 on its lower edge, which scrapes off the material which might otherwise adhere to this screw, and forces it to drop down on to the discharge tube 54, which directs it on to the belt conveyor 55.

The conveyor 55 shown in Figs. 1, 2 and 15, comprises a frame 59, pivotally mounted at 60, to swing about a horizontal axis, a conveyor belt 61, travelling over rollers 62, 63, 64, 65, 66, and 67, and an adjustable tension support 68, for holding the conveyor at the desired inclination. The rear end of the belt conveyor is made adjustable independently of the rest of the conveyor. This is accomplished by means of an auxiliary frame 69, pivotally mounted at 70, and held in various adjusted positions by means of a link 71 provided with a series of bolt holes in any one of which the bolts 72 may be inserted.

The hinged section of the conveyor permits the adjustment of the discharge ends to conform with the bore of the tunnel and uses as little room as possible in discharging into the cars.

The conveyor 55 may deliver the excavated material into dump cars which may be used to convey it away from the tunneling machine.

I have now described the parts which have to do directly with the excavating and conveying of the material. I will now describe the drive or transmission for the various material handling parts. These various parts are all driven from a single motor (which, also drives the caterpillars which propel the entire tunneling machine). These transmissions, include the transmission from the motor to the rotatable head which carries the boring and pick-up mechanism, the transmission from the motor to the conveyor screw, and the transmission from the motor to the conveyor belt.

I will first describe the transmission from the motor to the rotatable head which carries the boring and pick-up mechanism. Parts of this drive for the rotatable head are shown in Figs. 1, 2, 5, 6, 8, 17, 18, 19, 22, 23, and 24. This transmission or drive from the motor to the rotatable boring and pick-up head comprises the flexible coupling 73 secured to and rotatable with the shaft of the motor 74, a planetary gear reduction 75, driven from the flexible coupling 73, a gear 76, (Figs. 6 and 17) driven from the planetary gear reduction 75, a gear 77 meshing with the gear 76, a shaft 78 (Figs. 8, 17, 19, 22 and 24) on which gear 77 is secured, a clutch 79, having a driven member 80, which can be connected or disconnected with respect to the shaft 78, a spiral gear 81, secured to rotate with the driven clutch member 80, a spiral gear 82 meshing with the spiral gear 81, a shaft 83, to which the spiral gear 82 is secured, a worm 84, secured to rotate with the shaft 83, a worm gear 85, meshing with the worm 84, a shaft 86 to which the worm gear 85 is secured, a spur pinion 87 (Fig. 5) secured to the shaft 86, and a spur gear 88 meshing with the spur pinion 87, and secured to the rotatable boring head 31.

The gear 88, is provided with an annular bearing portion 89, which bears on rollers 90, mounted in brackets 91 (Fig. 5). These rollers take the thrust, due to the pressing of the knives against the face of the cut, and prevent the bending strain that would otherwise come upon the hub 92, of the rotatable head 31. The rotatable head 31, is secured in position on the stud or boss 36, by means of a spanner nut 93. By removing this nut and blocking up the rotatable head 31, with the boring bar and pick-up buckets supported thereby, the machine may be backed away from the face of the cut, and the tunnel may be bricked up to just in the rear of the buckets.

I will now describe the transmission for the screw conveyor: This transmission as shown in a general way in Figs. 1 and 2, is shown diagrammatically in Fig. 8, and parts of it are shown in detail in Figs. 6, 9, 10, 15, 16, 17 and 21. Referring particularly to the diagram showing in Fig. 8, the transmission for the conveyor comprises, in addition to the pinion 76 and gear 77, previously referred to, a long pinion 94, meshing with the spur gear 77, a gear 95, meshing with the pinion 94, a shaft 96, on which the gear 95 is secured a double acting clutch (Fig. 11) 97, mounted on shaft 96, two bevel gears 98 and 99 mounted on shaft 96 (either one of which bevel gears may be alternatively connected to rotate with the shaft 96 by means of the double-acting clutch 97 (see Fig. 10) a bevel gear 100 meshing with both of the bevel gears 98 and 99, a shaft 101 on which the bevel gear 100 is secured, (see Fig. 21) a bevel pinion 102 secured to the shaft 101, a bevel pinion 103 connecting with the bevel pinion 102, a shaft 104 to which the bevel pinion 103 is secured, a spur pinion 105 secured to the shaft 104, (Figs. 8 and 16) a spur gear 106 meshing with the pinion 105, a shaft 107 on which the gear 106 is rotatable, a spur pinion 108 secured to the gear 106 to rotate therewith, and a spur gear 109 meshing with the spur pinion 108, and secured to the shaft 110 of the conveyer screw.

Suitable bearings are provided for the various shafts, and suitable housings are provided for the various gears. By means of the clutch mechanism 97, either one of the bevel gears 98 or 99 can be connected up to rotate with the shaft 96, and the gear which is thus driven from shaft 96 will drive the bevel gear 100, the other one of the gears 98 or 99 being driven idly from the bevel gear 100. The direction of rotation of the bevel gear 100 depends upon which one of the gears 98 or 99 is connected up to rotate with the shaft 96. Thus the direction of rotation of the conveyor screw 53 is controlled.

I will now describe the drive for the conveyor 55: This is shown in a general way in Figs. 1 and 2, diagrammatically in Fig. 8, and parts of it are shown in detail in Figs. 6, 11, 12, 13, 14 and 17. Referring particularly to Figs. 8, 11, 12, 13 and 14, the transmission for the belt conveyor comprises, in addition to the pinion 76 spur gear 77, and long pinion 94, a spur gear 111 meshing with the spur pinion 94, a shaft 112 on which the spur gear 111 is secured, a clutch 113 (Figs. 8 and 11) having a driving portion 114 slidable on the shaft 112 but rotatable with said shaft and a driven portion 115 which can be connected or disconnected with respect to the driving member 114, a spiral gear 116, which may be formed integral with the sleeve of the driven clutch member 115 (see Fig. 12) a spiral gear 117, meshing with the spiral gear 116, a shaft 118 to which the gear 117 is secured, a sprocket wheel 119 (Figs. 11 and 13) secured to the shaft 118, a sprocket chain 120 driven by the sprocket 119, a sprocket wheel 121 (Fig. 2) driven by the sprocket chain 120, and a shaft 122 to which the sprocket 121 is secured (Fig. 6) to which shaft 122 is secured the drum which drives the conveyor belt 61.

I will now describe the caterpillar traction mechanism, and the transmission therefor by means of which the tunneling machine may be propelled to advance the boring head against the face of the cut, or may be withdrawn, to permit the tunnel to be bricked up, or for any other purpose. Describing first the caterpillar traction mechanism itself as distinguished from its transmission, this is shown in a general way in Figs. 1 and 2 and more in detail in Figs. 25 and 26. This comprises a pair of caterpillars, one for each side of the machine, both caterpillars being driven from a differential 123 (Fig. 25). The caterpillars are substantially the same, one being right hand, and one being left hand, and similar parts of each will be given like reference characters. Each caterpillar comprises an endless chain or link tread 124, a pair of rollers 125, (Fig. 26) one at the front and one at the rear of the caterpillar, a sprocket 126, meshing with both the upper and the lower run of the endless chain tread, and a two part frame 127 in which the rollers 125 and sprocket 126 are mounted. The frame 127 is made in right and left hand halves for convenience in manufacture and assembly. The sprocket 126 is mounted on a suitable bearing 128 in the frame 127. The hub portion of the sprocket of the left hand caterpillar is secured to a sleeve 129, which may be formed integral with a bevel gear 130 forming part of the differential 123.

The sprocket 126 of the right hand caterpillar is secured to rotate with the shaft 131, by means of a key 132, and the sprocket 133 of the differential 123 is also secured to this shaft 131 by means of a key 134. The shaft 131 extends through the sleeve 129 and this shaft and associated parts are secured in place by means of a nut 135 threaded on the ends of the shaft 131. The differential 123 comprises in addition to the bevel gears 130 and 133 a sprocket wheel 136 and a set of bevel pinions 137 meshing with the bevel gears 130 and 133 and mounted on pins or shafts 138, the pins 138 being mounted in a frame 139 to which the sprocket 136 is secured by means of bolts 140. The weight of the machine is supported on the caterpillars through bearings 141 and 142 (Fig. 25), the bearing 141 surrounding the sleeve 129 and the bearing 142 surrounding the shaft 131.

In order to adjust the rollers 125 to keep the chain tread at the proper tension, screws 143 are provided. these screws being threaded in lugs 144 of the frame 127, and being adjustable to shift the pin 145 on which the roller 125 is rotatably mounted.

I will now described the drive for the sprocket wheel 136 of the caterpillar traction mechanism. This transmission comprises a slow drive for the forward travel of the machine, and a faster drive for the rearward travel of the machine. It is to be stated, however, that by reversing the direction of the motor the faster drive may be used for forward travel. The slow drive comprises, in addition to the drive from the motor up to the shaft 78, a clutch 146 (Fig. 19) having a driving portion 147 rotatable with the shaft 78, and a driven portion 148, with respect to which the driving portion 147 can be connected and disconnected, a spiral gear 149 secured to rotate with the driven portion 148 of the clutch, a spiral gear 150 meshing with the spiral gear 149, a shaft 151 to which the spiral gear 150 is secured (Fig. 24) a worm 152 secured on the shaft 151, a worm wheel 153 meshing with the worm 152, a shaft 154 to which the worm wheel 153 is secured, a worm 155 (Fig. 23) secured to the shaft 154, a worm gear 156 meshing with the worm 155, a transversely extending shaft 157 to which the worm gear 156 is secured, a clutch 158 on the shaft 157, a sprocket wheel 159 also on the shaft 157, and with respect to which the clutch 158 can be moved into an outer engagement, and a sprocket chain 160 meshing with the sprocket 159 and also with the sprocket wheel 136 of the differential.

The high speed drive for the caterpillar is the same as the slow speed drive from the shaft 152 to the differential sprocket 136. When the high speed drive is used, the slow speed drive is disconnected by means of suitable clutch mechanism, and when the low speed drive is used the high speed drive is disconnected. The high speed drive comprises in addition to the drive from the shaft 152 to the differential sprocket 136 and in addition to the drive from the motor up to the long pinion 94, a pinion 161 movable in and out of mesh with the long pinion 94, (Fig. 17) a shaft 162 on which the pinion 161 is secured, a swinging bracket 163 (Figs. 20 and 28) in which the shaft 162 is mounted (by means of which the gear 161 may be swung into and out of mesh with respect to the long pinion 94) a pinion 164 meshing with the pinion 162, a shaft 165 on which the pinion 164 is mounted and which also serves as the pivot about which the bracket 163 swings. A spiral gear 166 secured on the shaft 165 and a spiral gear 167 meshing with the gear 166 and secured to the shaft 152. As stated above the drive from the shaft 152 on to the differential sprocket is the same as in the slow speed drive.

For holding the swinging bracket 163 in either of its two positions (in one of which the gear 161 is in mesh with the pinion 94 and in the other of which it is out of mesh) a spring pressed catch 168 (Fig. 28) is provided, which engages a stop or abutment 169 secured to the swinging bracket 163. The spring pressed catch 168 slides in guides 170. A coil compression spring 171 acts upwardly on the catch 168. For operating the catch 168 a pin 172 is secured to it and extends outwardly into a position where it can be operated manually. If the swinging bracket is in the position shown in Fig. 28, and it is desired to swing it so that the gear 161 will mesh with the pinion 94, the catch 168 is pressed down (the operator can do this by pressing down on the pin 172 with the foot) until the abutment 169 is free from the catch 168 and the bracket can be swung inwardly to cause the gear 161 to engage the pinion 94. When the gear is in engagement with the pinion, the catch 168 is released and it comes up behind the abutment 169 and holds the bracket in its inward position, and thus holds the gear 161 in mesh with the pinion 94., Suitable clutch mechanisms are provided for controlling the various transmissions. These include clutches for the transmission for the boring mechanism, for the transmission to the slow speed drive of the caterpillars, for the transmission to the conveyor, and for the transmission to the belt conveyor. As previously described, the transmission for the high speed drive of the caterpillars, is controlled by the swinging bracket which carries a gear 161 which is moved into or out of mesh with respect to the long pinion 94. The clutches for the control of the transmission to the boring mechanism and for the slow speed drive of the caterpillars are shown somewhat in detail in Fig. 19.

Describing first the clutch which controls the transmission for the boring mechanism, as previously described, the spiral gear 81 is part of this transmission. If it is driven, the boring mechanism will be driven, and if it is not driven the boring mechanism will not be driven. The clutch mechanism 79 which controls the connection between the shaft 78 and the spiral gear 81 comprises the driving member 173 of the clutch, which is slidably but non-rotatably mounted with respect to a sleeve 174 secured to the shaft 178, and a driven member 80 on the hub 175 to which the spiral gear 81 is secured. The driving member 173 may be shifted longitudinally with respect to the sleeve 174 to shift this driving member into and out of engagement with respect to the driven member 80. For effecting this longitudinal shifting of the driving member 173, shipper arms 176 are provided, the ends of which engage in a groove 177 in the driving member 173, the shipper arms being secured to a shaft 178 which is operated by a hand lever 179 (Figs. 2 and 6.)

The clutch mechanism which controls the low speed drive of the caterpillars is similar to the clutch mechanism just described. This clutch mechanism is shown somewhat in detail in Fig. 19. As previously described, the spiral gear 149 is a positive transmission for the slow speed drive caterpillar. When this spiral gear is driven the caterpillar will be driven at slow speed, and when this spiral gear is not driven the slow speed drive will not be in operation. For connecting and disconnecting this spiral gear 149 with respect to the driving shaft 78 the clutch mechanism 146 previously described is provided. This comprises the driving clutch member 147, which is slidably but non-rotatably mounted with respect to the sleeve 174 (this sleeve 174 as previously described being secured to rotate with the shaft 78), and the driven clutch member 148 on the hub of which the spiral gear 149 is secured. The driving clutch member 147 can be shifted longitudinally on the sleeve 174 so as to be moved into or out of engagement with respect to the driven clutch member 148. For effecting this shifting movement the driving clutch member 147 is provided with a groove 180 into which the ends of the shipper arms 181 extend, these shipper arms being mounted on a rock-shaft 182, which is manually operable by means of a hand lever 183 (Figs. 2, 6, and 7).

The clutch mechanism for the screw conveyor 53 comprises means whereby the screw conveyor can be connected so as to be driven in either direction of rotation and also that it can be completely disconnected. This clutch mechanism for controlling the drive for the screw conveyor is shown somewhat in detail in Figs. 10, 11, and 21. As previously described, the shaft 101 (Fig. 21), is part of the transmission to the screw conveyor. When this is turned in one direction, the screw conveyor is turned in one direction, and when this shaft 101 is turned in the other direction the screw conveyor is turned in the opposite direction. If the shaft 101 is not driven, the screw conveyor is not driven. For alternatively driving the shaft 101 in opposite directions the bevel gears 98 and 99 (Fig. 11) are alternatively brought into operation as a driver for the bevel gear 100, (which is keyed to the shaft 101). For alternatively putting into operation as a driver the bevel gears 98 and 99 the clutch mechanism 97 is employed. This is constructed so that either one of the bevel gears 98 and 99 may alternatively be connected up to be driven from the shaft 96. This clutch mechanism comprises a double acting driving member 184 (which is slidably but non-rotatably mounted with respect to a sleeve 185 secured to the shaft 96), a driven clutch member 186 on the hub of which the bevel gear 98 is secured (and with respect to which the driving clutch member 184 is shiftable into and out of engagement) and a driven clutch member 187 on the hub of which the bevel gear 99 is secured (and with respect to which the driving clutch member 184 is movable into and out of engagement). The driving clutch member 184 is shifted back and forth to bring it into engagement alternatively with the driven clutch members 186 and 187 or to throw it out of engagement with both of the driven clutch members by means of a yoke 188 (Fig. 21) this yoke 188 being provided with shipper fingers 189 for engagement with the groove 190 of the driving clutch member 184. The yoke 188 is secured to a rock shaft 191 (Figs. 10 and 21) and this rock-shaft is operated from a hand lever 192, through a link 193, pivotally connected to the hand lever 192 and also pivotally connected to a rock arm 194 secured to the rock-shaft 191.

The clutch mechanism for controlling the belt conveyor is shown somewhat in detail in Figs. 10, 11, 12, and 14. As previously described, the spiral gear 116 (Figs. 11, 12, and 14) is part of the transmission to the belt conveyor. When this spiral gear is driven the conveyor belt will be driven, and when this spiral gear is not driven the conveyor belt will not be driven. The clutch mechanism for controlling the driving of this spiral spiral gear 116 comprises the driven clutch member 115 (which may be formed integral with the spiral gear 116) and the driving clutch member 114 (which is slidably but non-rotatably mounted with respect to the sleeve 195, which sleeve 195 is keyed to the shaft 112. For shifting the driving clutch member 114 into and out of engagement with respect to the driven clutch member 115 a shipper arm 196 is provided, having a shipper finger 197 for engaging a groove 198 in the driving clutch member 114. This shipper arm 196 is pivotally mounted on a pin 199 and is operated from the hand lever 200 (Fig. 10) by means of a link 201 having a pivotal connection with the lever 200 and also have a pivotal connection with the shipper arm 196.

In Figs. 29, 30, 31, and 32 I have shown a form of spring pressed knife which may be secured to the boring bar 32 for making the cut. This knife or cutter is yieldingly he'd to its work by means of a torsion spring, the tension of which can be readily adjusted. The knife with its mounting comprises a bracket 202, secured to the boring bar 32 by means of a U bolt 203, a pin 203ª supported by the bracket 202, a knife holder 204, pivotally mounted on the pin 203ª, a pair of ratchet wheels 205 secured on the squared ends 206 of the pin 203ª, for adjusting the tension of the torsion springs 207, which surround the pin 203ª, and a pair of pawls 208, one for each of the ratchet wheels 205, for holding these ratchet wheels in adjusted position against the action of the torsion springs 207, and for holding them in any position to which they may be turned in tightening up or adjusting the tension of these coil springs 207.

The ends of the U bolt 203 extend through holes in a strap 209 and are secured by means of nuts 210 threaded on the ends of U bolts 203. One end of each spring 207 is secured to the knife holder 204 by being inserted through an opening in a lug 211, the other end of each spring being secured to one of the ratchet wheels 205 by being inserted through an opening 212 in the ratchet wheel. To adjust the tension of the springs 207, a wrench or other suitable tool is applied to the squared end 206 of the shaft or pin 203 and if it is desired to tighten up the spring, the pin is turned clockwise as shown in Fig. 31 until the desired spring tension is reached. If it is desired to slacken the spring the pin is turned slightly clockwise as shown in Fig. 31 and the pin is then allowed to turn counter clockwise until it is sufficiently loose when the pawls 208 are again thrown in.

The knives 213 are made quickly detachable with respect to the knife holder 204, being provided with a shank 214 which can be inserted in a corresponding opening in the knife holder.

When the knife is in operation, when an obstruction is encountered, it will yield and when the obstruction is passed, will spring back to position, as indicated by dotted lines in Fig. 31, to prevent the knife or knife holder from being injured by the unusual strain.

The rear end of the machine is supported by a pair of flange wheels 215 (Figs. 1, 2 and 6) which can be turned on vertical axes to steer the machine and with respect to which the rear end of the machine is vertically adjustable. These wheels may run on tracks 216 which may be laid in front of the wheels, and which tracks may rest on cross pieces 217 placed in the bottom of the bore of the tunnel. The mechanism for shifting the wheels 215 about their vertical axes and for adjusting the rear end of the machine with respect to these wheels may be substantially the same as that disclosed in my co-pending application Serial No. 257,965 filed Oct. 14, 1918. Briefly stated, the wheels 215 are mounted in brackets 218 with respect to which the rear end of the machine is vertically adjustable by means of a double threaded screw 219 provided with a spanner nut 220. In order that each wheel 215 may be turned about a vertical axis, it is mounted in a yoke 221 (Fig. 2) which yoke is swiveled in the bracket 218. Each yoke 221 is provided with a rearwardly extending arm or lever 222 (Fig. 6) on which is swiveled a nut 223 in which a screw 224 is threaded. The inner end of this screw 224 is connected by a universal joint to a bracket 225 and means are provided for rotating the screw 224, such as a hand wheel 226 or the like (Fig. 1). The rotation of this screw 224 will cause the yoke 215 to be turned about its pivot. Thus the rear end of the machine can be steered in either direction and by means of the spanner nut 220, the rear end of the machine can be raised or lowered with respect to the wheels 215.

The cutting bar 32 is placed practically parallel with the radii of the crosshead and at such distance therefrom as to bring the cutting edges of the knives on the radii. This is desirable to prevent a side action in the direction of the radii which twists the knives.

It has been found desirable that the pick-up arms should be designed so as to be quickly detachable and removable.

In Figs. 25 to 39 inclusive are shown several forms of construction for connecting the pick-up bucket and chute to the rotatable boring head.

Referring first to the form of construction shown in Figs. 33, 34, and 35, in this form as in the form shown in Figs. 3 and 4, the pick-up buckets 33 are adjustably secured to the chute 34 by means of bolts 40 which may be inserted in the registering holes 39 in the buckets and chutes, and the sides of the chutes 34 are connected to the rotatable head 31 by means of connecting plate 43, riveted to the sides of the chute and secured to the rotatable head 31 and ring 42 by means of long bolt 44, extending through and between the ring 42 and the rotatable head 31. The rear edge of the chute 34 rests against the edge of the channel shaped rib 41. The chute is secured to this rib 41 by means of a plate 227 riveted to the rear side of the chute 34, and having openings to receive the staples 228 which are secured to the rib 41. Cotter pins 229 are inserted through the staples 228 to hold the parts in assembled position.

In assembling the chute on the rotatable boring head, the chutes are handled so that the plates 227 are brought into position so that they can be slipped on to the staples 228, the staples entering the slots in the plate and the cotter pins 229 are then inserted in the staples. The front part of the bucket is secured to the rotatable boring head by inserting the long bolt 44.

The construction shown in Figs. 36 and 37 is substantially the same as that shown in Figs. 33, 34 and 35 except that a hook member 230 is substituted for the staple 228 and the cotter pin 229. In assembling this device, the plate 227 is slipped on over the hooks 230, the chute is swung about its rear edge until it is in operative position, and when the bolt 44 is inserted, it holds the parts in assembled position.

In the construction shown in Figs. 38 and 39 the chute 34 has secured thereto an angle iron 231, having holes through which are inserted hook bolts 232, the hook ends of these bolts being hooked over a long bolt 233 extending between the rotatable head 41 and the supporting ring 42. The front end of the chute is secured in position by means of the bolt 44 as in the other forms. To secure the chute in place, the nuts 234 on the hook bolts 232 are backed off sufficiently to allow the hooked ends of the bolt to be engaged over the long bolt 233, the chute is placed in position, the hook ends of the hook bolt 232 are engaged over the long bolt 233, and the nuts 234 are then tightened up and the long bolt 44 is placed in position and secured.

In Figs. 40, 41 and 42 I have shown a tilting chute which can be tilted to deflect the material discharged from the conveyor belt 51, either to the left or the right, so that it can be discharged into either one of two cars which may be located side by side on two parallel tracks. Referring to this construction in detail, the tilting chute 235 is firmly secured to a rockbar 236 which is pivotally mounted in bearing straps 237 secured to the supporting brackets 238 and 239 respectively, (Figs. 41 and 42). These brackets 238 and 239 are secured to the frame 69 by means of bolts 240. The tilting movement of the chute 235 may be limited by the bottom of the chute coming in contact with the angle-irons 241 located on opposite sides of the belt 61, these angle-irons 241 forming part of the frame 69. A counterweight 242 is provided, which is secured to an arm 243 which may be formed integral with the rockshaft 236. This counterweight 242 is so arranged that it will hold the chute in either of its two operative positions, whichever it is moved into. In one position, the chute 235 discharges into a car 244, as indicated in Fig. 42, and in its other operative position the chute 235 discharges into the car 245, which is located beside the car 244.

The operation of the various parts of the machine is as follows:

Assuming that the machine is in position in the tunnel as shown in Figs. 1 and 2, and it is desired to start work, and assuming that all of the clutches are in disconnecting positions, the motor 74 is put in operation, the screw conveyor 53 is put in operation by operating the clutch lever 192 to throw the clutch 97 to a position to cause the screw conveyor 53 to rotate in a direction which would move material in the conveyor tube 52 rearwardly, the lever 200 is shifted to throw in the clutch which controls the conveyor belt 59, and the clutch lever 179 is shifted to a position to throw in a clutch which causes the rotation of the boring head. After these clutches have been thrown in, the clutch lever 183 is shifted to a position to cause the slow speed forward drive of the caterpillars. As the caterpillars advance the knives on the boring edge cut and tear out the material at the face of the cut, which material falls down and is scooped up by the pick-up buckets 33, and delivered through the chutes 34 to the hopper 35 which guides it into the conveyor tube 52 along which it is moved by the conveyor screw 53. The conveyor screw forces the material out of the conveyor tube 52, the rib 58 acting to help to free the material from the conveyor screw.

The material falls on the discharge chute 53 which guides it onto the conveyor belt, which conveys it rearwardly.

When it is desired to back up the machine, that is, to move it away from the face of the cut, all of the clutches are thrown out, and the swinging bracket 163 is moved to a position which will cause the gear 161 to engage the long pinion 94, the motor in the meantime being stopped. The motor is then started up and the machine is quickly moved to the rear.

The clutch which drives the screw conveyor is set loose enough so that if a stone or other obstruction should become jammed in this screw conveyor, the clutch would slip and thus prevent damage. In such case the lever 192 can be shifted to reverse the direction of rotation of conveyor screw, which will free the obstruction.

The material which is delivered by the conveyor belt 61 to the discharge chute 235 can be deflected into either one of the cars 244 or 245 by simply taking hold of the chute 235 and swinging it into position to discharge either to the right or left, whichever is desired. The counterweight 242 will hold the chute 235 in whichever position it is placed.

I claim:

1. A tunneling machine comprising a rotatable boring head for freeing the material, and a pick-up mechanism for picking up the freed material from the bottom of the bore, comprising a central rotatable receiving chamber to which the material is to be delivered, a chute having a quick-detachable connection with respect to said rotatable central chamber, and a pick-up bucket adjustably secured to said chute.

2. A tunneling machine comprising a rotatable boring head for freeing the material, and a pick-up mechanism for picking up the freed material from the bottom of the bore, comprising a rotatable central receiving chamber to which the material is to be delivered, a pick-up bucket having a quick-detachable connection with respect to said rotatable chamber, and a pick-up bucket adjustable radially on said chute.

3. A tunneling machine comprising a rotatable cutter for freeing the material and a pick-up mechanism for scooping up the freed material from the bottom of the bore, comprising a central rotatable head, a chute having a quick-detachable connection with respect to said central rotatable head, and a pick-up bucket adjustably secured on said chute.

4. A tunneling machine comprising a rotatable cutter for freeing the material and a pick-up mechanism for scooping up the freed material from the bottom of the bore, comprising a central rotatable chamber, a series of pick-up buckets in communication with said rotatable chamber, and a hopper located inside said rotatable chamber to which the material from said pick-up buckets is delivered.

5. A tunneling machine comprising a rotatable cutter for freeing the material, and a pick-up mechanism for scooping up the freed material from the bottom of the bore, comprising a central rotatable chamber, a series of pick-up buckets for scooping up the freed material, in communication with said chamber, a conveyor tube substantially coaxial with said central rotatable chamber, and a hopper inside said central rotatable chamber, which receives the material from said pick-up buckets and delivers it to said conveyor tube.

6. A tunneling machine comprising a rotatable head, a series of combined scoop and chute devices mounted thereon, a hopper to which said device deliver material, said devices being rotatable about said hopper, the sides and bottom of said hopper being spaced from said chute and a baffle located so that the delivery side of said chute travels close thereto on its upward movement, to prevent the material from the chute from dropping out until the buckets are high enough to let the material drop into the hopper.

7. A tunneling machine comprising a rotatable head, a series of combined scoop and chute devices secured to said head, and a guide for causing the material to drop out of said devices into said hopper, the guide being made of material which can be bent easily so as to prevent injury to the machine in case the material gets caught between the discharge end of the chute and the guide.

8. A tunneling machine comprising a pick-up mechanism including a circular head, a ring of substantially the same diameter as said circular head, a plurality of supports, extending between said circular head and ring near their circumferences, and spaced from each other to provide a plurality of passages between said ring and head, a plurality of pick-up buckets supported by said supporting member and delivering material through said passages to the space between said head and ring, and a hopper located in the space between said head and ring to which the pick-up buckets deliver the material.

9. A tunneling machine comprising a pick-up mechanism including a circular head and a ring of substantially the same diameter as said circular head, a plurality of supporting members extending between said circular head and ring near their circumferences, and spaced from each other to provide a plurality of passages between said ring and head, a plurality of pick-up buckets supported by said supporting members and delivering material through said passages to the space between said head and ring, a hopper located in the space between said head and ring, to which the pick-up buckets deliver the material, and a shield located in the space between said head and ring for preventing material from falling out between the supporting members before the buckets are in position to deliver to the hopper.

10. A tunneling machine comprising a pick-up mechanism, including a rotatable circular head, a ring of substantially the same diameter as said circular head, a plurality of supports extending between said circular head and ring near their peripheries, spaced from each other to provide a plurality of passages between said ring and head, and a plurality of pick-up buckets supported by said supporting members and delivering material through said passages to the space between said head and ring.

11. A tunneling machine comprising a pick-up mechanism including a rotatable substantially circular head, a ring lying in a plane parallel to said head of substantially the same diameter and spaced therefrom, a plurality of combined scoop and chute devices secured to said head and ring, and securing means for each of said devices comprising a long bolt extending through both said head and ring, and a part of said device.

12. A tunneling machine comprising a rotatable substantially circular head, a rotatable ring spaced from the head, lying in a plane substantially parallel to said head, and a plurality of connecting members extending between the head and ring, each connecting member having two substantially radially extending walls, and a trough shaped member for directing material through the spaces between said members.

13. A tunneling machine comprising a rotatable substantially circular head, a rotatable ring spaced from said head and lying in a plane substantially parallel to said head, a plurality of connecting members extending between said head and ring, each connecting member having two substantially radially extending walls, and a trough shaped member for directing material through the spaces between said members, the rear edge of one of said trough shaped members resting on the outer edge of one of the walls of the connecting member.

14. A tunneling machine comprising a rotatable boring and pick-up head, a conveyor for receiving the material from the pick-up mechanism, a motor, transmission mechanism between said motor and boring and pick-up head, transmission mechanism between said motor and said conveyor, traction mechanism, and transmission mechanism between said motor and said traction mechanism, and a frame supported by said traction means and supporting said motor, said boring head and pick-up mechanism being quickly detachable with respect to said frame, whereby the boring and pick-up mechanism may be quickly detached and left in place at the front of the bore, and the machine backed away to permit the bore to be lined up to just in the rear of the boring and pick-up head.

15. A tunneling machine comprising a conveyor tube, a hopper in communication therewith, a screw conveyor operating in said tube, pick-up mechanism for delivering the material to the hopper, motor means, transmission means between said motor and screw, and means whereby the direction of rotation of said screw may be reversed.

16. A tunneling machine comprising a rotatable head, a cutter mounted on said head for movement with respect thereto for loosening the material, a spring for yieldingly holding said knife in cutting position whereby the cutter can yield when it encounters an obstruction, and means for varying the yielding pressure exerted by said spring on said cutter.

17. A tunneling machine comprising a head rotatable about a substantially horizontal axis, a cutter pivotally mounted on said head for movement about an axis substantially perpendicular to the axis of said rotatable head, a spring for yieldingly holding said cutter in cutting position whereby said cutter can yield when it encounters an obstruction, and means for varying the yielding pressure exerted by said spring on said cutter.

18. A tunneling machine comprising a cutting head rotatable about a substantially horizontal axis, a cutter pivotally mounted on said head to move about an axis substantially perpendicular to the axis of said rotatable head; and spring means for yieldingly holding said cutter in operative position, whereby said cutter can yield when it encounters an obstruction, said spring means comprising a coil torsion spring, the axis of which is substantially coincident with the axis of said cutter, and means for varying the pressure exerted by said spring on said cutter.

19. A tunneling machine comprising a pivotally mounted cutter, and means for yieldingly holding said cutter in cutting position whereby said cutter can yield when it encounters an obstruction, said yielding means comprising a coil torsion spring, the axis of which is substantially coincident with the axis of said cutter, and means for adjusting the tension of said coil torsion spring comprising a rotatable member to which one end of said torsion spring is secured.

20. A tunneling machine comprising a rotatable boring head, a cutter pivotally mounted on said boring head, and means for yieldingly holding said cutter in operative position whereby it can yield when it encounters an obstruction, comprising a coil torsion spring, the axis of which is substantially coincident with the axis of said cutter, and means for adjusting the tension of said spring comprising a rachet wheel to which one end of said spring is secured.

In witness whereof, I have hereunto subscribed my name.

LOUIS W. ANDERSON.

Witnesses:
J. C. SHINKMAN,
GEO. E. FOWLER.